United States Patent
Kothari et al.

(10) Patent No.: US 8,527,336 B2
(45) Date of Patent: Sep. 3, 2013

(54) PAYMENT METHOD DECISION ENGINE

(75) Inventors: Sanjay Kothari, New York, NY (US); Vinay Pulim, New York, NY (US)

(73) Assignee: Sanjay Kothari, New York, NY (US)

( * ) Notice: Subject to any disclaimer, the term of this patent is extended or adjusted under 35 U.S.C. 154(b) by 44 days.

(21) Appl. No.: 13/041,278

(22) Filed: Mar. 4, 2011

(65) Prior Publication Data

US 2011/0218884 A1 Sep. 8, 2011

Related U.S. Application Data

(60) Provisional application No. 61/339,380, filed on Mar. 4, 2010.

(51) Int. Cl.
*G06Q 30/00* (2012.01)

(52) U.S. Cl.
USPC .............. 705/14.33; 705/14.3; 705/14.23; 705/14.27; 705/14.28; 705/14.29

(58) Field of Classification Search
USPC .......................................... 705/14.33
See application file for complete search history.

(56) References Cited

U.S. PATENT DOCUMENTS

| | | | | |
|---|---|---|---|---|
| 5,056,019 A * | 10/1991 | Schultz et al. | ............. | 705/14.25 |
| 5,245,533 A * | 9/1993 | Marshall | .................. | 705/14.13 |
| 5,960,411 A * | 9/1999 | Hartman et al. | .......... | 705/26.81 |
| 6,167,383 A * | 12/2000 | Henson | ...................... | 705/26.5 |
| 6,460,020 B1 * | 10/2002 | Pool et al. | .................... | 705/7.29 |
| 6,594,640 B1 * | 7/2003 | Postrel | ...................... | 705/14.27 |
| 7,424,455 B2 | 9/2008 | Kellogg et al. | | |
| 2002/0077835 A1 * | 6/2002 | Hagelin | ........................ | 705/1 |
| 2002/0077890 A1 | 6/2002 | LaPointe et al. | | |
| 2002/0123926 A1 * | 9/2002 | Bushold et al. | ................. | 705/14 |
| 2006/0010034 A1 | 1/2006 | Sparks | | |
| 2007/0244767 A1 | 10/2007 | Goel | | |
| 2007/0271150 A1 * | 11/2007 | Abbott | ........................... | 705/26 |
| 2008/0040220 A1 | 2/2008 | Levy et al. | | |

FOREIGN PATENT DOCUMENTS

| WO | 2011109781 A2 | 9/2011 |
|---|---|---|
| WO | 2011109781 A4 | 3/2012 |

OTHER PUBLICATIONS

First Data(TM) Market Brief "Credit Card Rewards—Consumer Insights", 2008.*
International Search Report and Written Opinion, Int'l Appl. PCT/US11/27306, mailed Nov. 21, 2011, 11 pages.
PCT/US2011/027306, "International Application Serial No. PCT/US2011/027306, International Preliminary Report on Patentability mailed Sep. 13, 2012", 10 pages.

* cited by examiner

*Primary Examiner* — John G Weiss
*Assistant Examiner* — Scott C Anderson
(74) *Attorney, Agent, or Firm* — GTC Law Group LLP & Affiliates

(57) ABSTRACT

A computerized system and method that enables identifying the best payment currency for a product or service is disclosed. Payment currencies include cash, reward programs and the unit or currency in which reward programs are denominated, and combinations thereof. A single product search request initiates searches of multiple payment currencies. Availability, discounts, prices, comparable costs, net values and relative values are determined and/or calculated per each payment currency. Comparable cost, relative value, or other criteria, may be used to determine the best payment method, that is, the lowest cost in a common currency, such as cash. Determination of the best payment currency is accomplished in "real-time" and has an advantage of leveraging quantitative and qualitative analysis in its determination. In addition, the search may be personalized by adding information unique to each user.

30 Claims, 46 Drawing Sheets

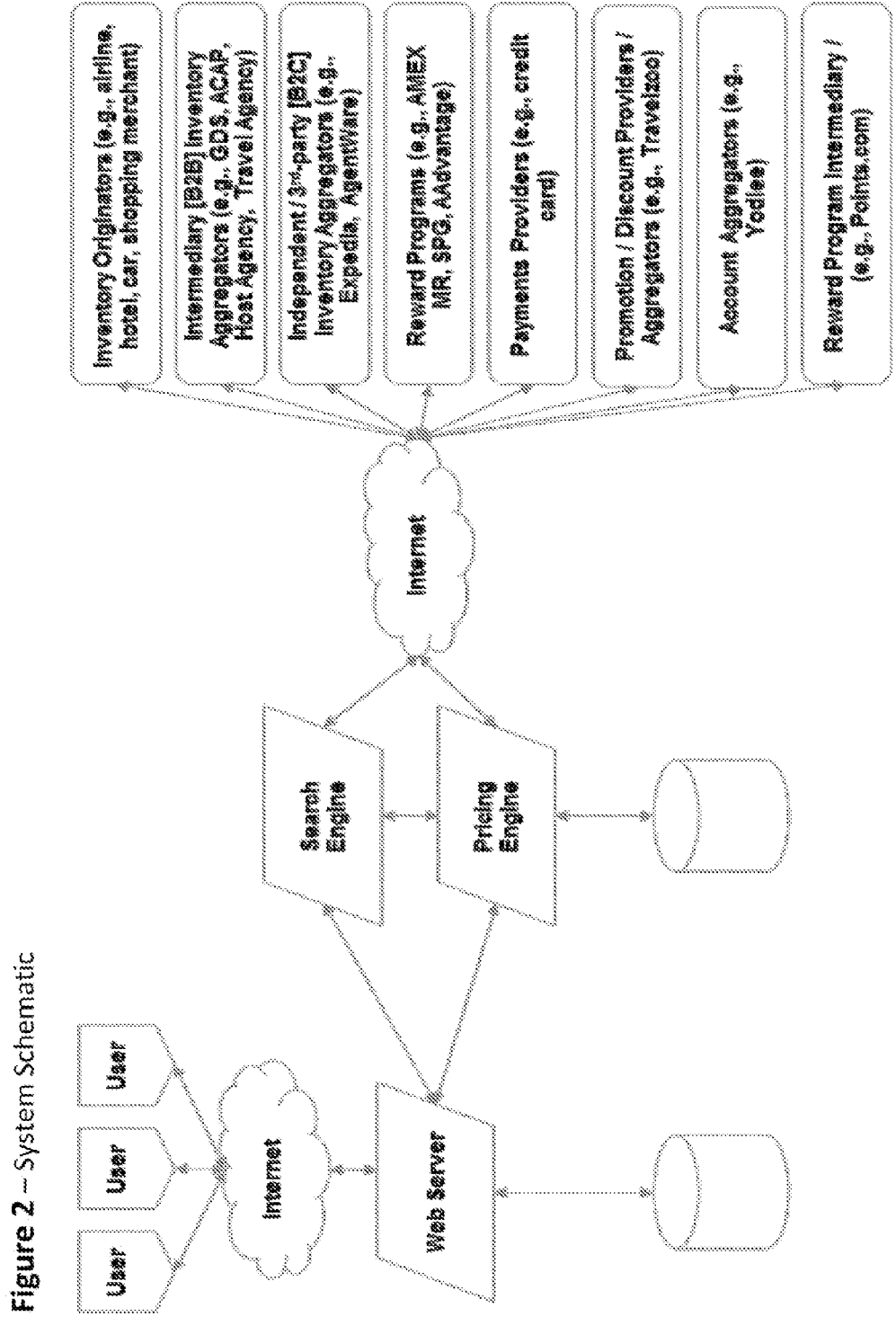
Figure 2 – System Schematic

Figure 3 – Process Flow Chart

Figure 4 — Personalization Survey: Detailed Inquiry

*Please answer 2 questions to personalize your results:*
*(or skip and we will apply average mile & point redemption values)*

What activity do you typically redeem for?

|  | Often | Sometimes | Rarely | Never |
|---|---|---|---|---|
| — Flights | O | O | O | O |
| — Hotels | O | O | O | O |
| — Cars | O | O | O | O |
| — Shopping | O | O | O | O |

What level of services do you redeem for?

|  | Often | Sometimes | Rarely | Never |
|---|---|---|---|---|
| — Luxury (e.g., first class flight) | O | O | O | O |
| — Premium (e.g., business class flight) | O | O | O | O |
| — Economy (e.g., coach class flight) | O | O | O | O |

Click here for more advanced customization

Enter your e-mail to remember these settings

Figure 5 – Personalization Survey: Brief Inquiry

Question 1 of 2
How do you prefer to spend your miles and points?
- Travel
- Merchandise
- Both
- No Preference Skip Question Question 2 of 2
When traveling, what service level do you tend to redeem for?
- Basic  (ex. economy class)
- Premium  (ex. business or first class)
- Both
- No Preference Skip Question milewise

| Airline | true cost |
|---|---|
| ▶ American | $91 |
| Delta | $93 |
| United | $95 |
| Northwest | $102 |
| ▶ Program | |
| Amex | $91 |
| Starwood | $193 |
| ▶ Method | |
| pay $ | $100 |
| use miles | $194 |
| transfer | $238 |
| pay w/points | $91 |
| upgrade | $332 |
| ▶ Cabin | |
| coach | $91 |
| business | $332 |
| first | $332 |
| ▶ Stops | |
| nonstop | $91 |
| 1 stop | $100 |

Already have an account? sign in

After searching 4 airlines and 2 reward programs we found the following results for: New York, NY to San Francisco, CA   Wed Mar 17 2010 view: [by flight]   by payment method flight details | [pay$] | [use miles] | [transfer] | [pay w/ points] | [upgrade] | [combine methods]

AA  JFK - SFO 10:35a     $140     12,500 AAdvantage miles     12,500 Starwood points     best overall 14,669 Amex points true cost: (what is this?) | $100 | $194 | $291 | $91
▶ analysis AA  JFK - SFO 7:05a     $140     12,500 AAdvantage miles     12,500 Starwood points     best overall 14,669 Amex points true cost: | $100 | $194 | $291 | $91
▶ analysis

*FIG. 6A*

| | $140 | 12,500 AAdvantage miles | 12,500 Starwood points | best overall 14,669 Amex points |
|---|---|---|---|---|
| JFK - SFO 3:15a | | | | |
| true cost: | $100 | $194 | $291 | $91 |
| ▶ analysis | | | | |

| | $140 | 12,500 AAdvantage miles | 12,500 Starwood points | best overall 14,669 Amex points |
|---|---|---|---|---|
| JFK - SFO 6:00p | | | | |
| true cost: | $100 | $194 | $291 | $91 |
| ▶ analysis | | | | |

| | $140 | 12,500 AAdvantage miles | 12,500 Starwood points | best overall 14,669 Amex points |
|---|---|---|---|---|
| JFK - SFO 9:00a | | | | |
| true cost: | $100 | $194 | $291 | $91 |
| ▶ analysis | | | | |

| ▲DELTA | $140 | 40,000 SkyMile miles + $3 | 40,000 Amex points + $24 | best overall 14,669 Amex points |
|---|---|---|---|---|
| JFK - SFO 7:05p | | | | |
| true cost: | $102 | $587 | $380 | $93 |
| ▶ analysis | | | | |

☑ 2 + stops
retake survey
reset answers

FIG. 6B

| ▲DELTA<br>JFK - SFO 5:00p | $140 | 25,000<br>SkyMile miles<br>+ $3 | 25,000<br>Amex points<br>+ $15 | best overall<br>14,669<br>Amex points |
|---|---|---|---|---|
| true cost: | $102 | $368 | $238 | $93 |
| ▶analysis | | | Amex points | |

| ▲DELTA<br>JFK - SFO 7:10a | $140 | 25,000<br>SkyMile miles<br>+ $3 | 25,000<br>Amex points<br>+ $15 | best overall<br>14,669<br>Amex points |
|---|---|---|---|---|
| true cost: | $102 | $368 | $238 | $93 |
| ▶analysis | | | | |

| ▲DELTA<br>JFK - SFO 9:45a | $140 | 25,000<br>SkyMile miles<br>+ $3 | 25,000<br>Amex points<br>+ $15 | best overall<br>14,669<br>Amex points |
|---|---|---|---|---|
| true cost: | $102 | $368 | $238 | $93 |
| ▶analysis | | | | |

| ▲DELTA<br>JFK - SFO 2:50p | $140 | 25,000<br>SkyMile miles<br>+ $3 | 25,000<br>Amex points<br>+ $15 | best overall<br>14,669<br>Amex points |
|---|---|---|---|---|
| true cost: | $102 | $368 | $238 | $93 |
| ▶analysis | | | | |

FIG. 6C milewise

Already have an account? sign in

After searching 4 airlines and 2 reward programs we found the following results for: New York, NY to San Francisco, CA   Wed Mar 17 2010 view: [by flight]  by payment method

| | pay $ | use miles | transfer | pay w/ points | upgrade | combine methods |
|---|---|---|---|---|---|---|
| flight details | | | | | | |
| ✈ JFK - SFO 10:35a | $1,133 | 25,000 AAdvantage miles | 20,000 Starwood points | 113,969 Amex points | best overall 15,000 AAdvantage miles + 140 | |
| true cost: (what is this?) $1,083 ▶ analysis | $1,083 | $388 | $466 | $964 | $332 | |
| ✈ JFK - SFO 7:05a | $2,683 | 65,000 AAdvantage miles | 50,000 Starwood points | 268,968 Amex points | best overall 15,000 AAdvantage miles + $140 | |
| true cost: ▶ analysis | $2,623 | $1,008 | $1,212 | $2,334 | $332 | |

▶ Airline | true cost
 ☑ American | $332
 ☑ Delta | $400
 ☑ United | $500
 ☑ Northwest | $700

▶ Program
 ☑ Amex | $964
 ☑ Starwood | $466

▶ Method
 ☑ pay $ | $1,083
 ☑ use miles | $388
 ☑ transfer | $466
 ☑ pay w/points | $964
 ☑ upgrade | $332

▶ Cabin
 ☐ coach | $91
 ☑ business | $332
 ☑ first | $500

▶ Stops
 ☑ nonstop | $332
 ☑ 1 stop | $400

*FIG. 6D* milewise

| Airline | true cost |
|---|---|
| ☑ American | $91 |
| ☑ Delta | $93 |
| ☑ United | $95 |
| ☑ Northwest | $102 |

▶ Program
- ☑ Amex $91
- ☑ Starwood $193

▶ Method
- ☑ pay $ $100
- ☑ use miles $194
- ☑ transfer $238
- ☑ pay w/points $91
- ☑ upgrade $332

▶ Cabin
- ☑ coach $91
- ☑ business $332
- ☑ first $332

▶ Stops
- ☑ nonstop $91
- ☑ 1 stop $100

---

Already have an account? sign in

After searching 4 airlines and 2 reward programs we found the following results
for: New York, NY to San Francisco, CA   Wed Mar 17 2010 view: [by flight]  by payment method

| flight details | pay $ | use miles | transfer | pay w/ points | upgrade | combine methods |
|---|---|---|---|---|---|---|
| | | | | best overall | | |
| ✈ JFK - SFO 9:00a | $140 | 12,500 AAdvantage miles | 12,500 Starwood points | 14,669 Amex points | | |
| true cost: | $100 | $194 | $291 | $91 | | |
| ▶ analysis | | | | | | |
| True Cost Calculation | | | | | | |
| what you pay | $140 | $194 | $291 | $131 | | |
| − what you earn | $40 | $0 | $0 | $40 | | |
| = true cost | $100 | $194 | $291 | $91 | | |
| Relative Value Calculation | | | | | | |
| flight mile/point value | | 1.12 cents | 1.12 cents | 1.27 cents | | |
| / normal mile/point value | | 1.55 cents | 2.33 cents | 0.89 cents | | |
| = relative value | | 0.72x | 0.48x | 1.43x | | |

*FIG. 7A*

FIG. 7B milewise

| Airline | true cost |
|---|---|
| American | $900 |
| Delta | $1,000 |
| United | $806 |
| Program | |
| Amex | $5,000 |
| Starwood | $4,052 |
| Method | |
| pay $ | $2,160 |
| use miles | $1,640 |
| transfer | $4,052 |
| pay w/points | $4,327 |
| upgrade | $806 |
| Cabin | |
| coach | $205 |
| business | $806 |
| first | $900 |
| Stops | |
| nonstop | $806 |
| 1 stop | $900 |
| 2+ stops | $1,155 | retake survey
use defaults

Already have an account? sign in

After searching 3 airlines and 5 reward programs we found the following results
for: New York, NY to San Francisco, CA  Wed Mar 24 2010 - Wed Mar 31 2010 view: [by flight]  by payment method

| flight details | pay $ | use miles | transfer | pay w/ points | upgrade | combine methods |
|---|---|---|---|---|---|---|
| | | | | | best overall | |
| UNITED JFK - SFO 6:00a SFO - JFK 7:08a | $2,265 | 100,000 MileagePlus miles + $5 | 160,000 Starwood points | 175,000 Starwood points | 30,000 MileagePlus miles + $399 | |
| true cost (what is this) | $2,160 | $1,640 | $4,052 | $4,327 | $806 | |
| ▶ analysis | | | | | | |
| True Cost Calculation | | | | | | |
| what you pay | $2,265 | $1,640 | $4,052 | $4,432 | $890 | |
| - what you earn | $105 | $0 | $0 | $105 | $84 | |
| = true cost | $2,160 | $1,640 | $4,052 | $4,327 | $806 | |
| Relative Value Calculation | | | | | | |
| flight mile/point value | | 2.26 cents | 1.42 cents | 1.36 cents | 6.50 cents | |
| / normal mile/point value | | 1.64 cents | 2.53 cents | 2.53 cents | 1.64 cents | |
| = relative value | | 1.38x | 0.56x | 0.54x | 3.98x | |

($2265 B/F fare - $299 C/B fare - $100 upgrade fee + $84 in earned miles) / 30000 MileagePlus miles

*FIG. 7C*

| Payment view<br>Cheapest flight per payment method | Flight view<br>All payment methods for each flight | | | | Flight Details | | | |
| --- | --- | --- | --- | --- | --- | --- | --- | --- |
| Option | Price | Deal | $ Cost | Saving vs. Cash Price | Airline | Class | Airport | Time | Stop |
| P | 45,000<br>AMEX points | ✓ | $250 *Cheapest* | $200 | DL | B<br>B | JFK→SFO<br>SFO→JFK | 9am<br>9pm | 1<br>1 |
| C | 25,000<br>AA miles + $50 | ✓ | $300 | $150 | AA | B<br>B | JFK→SFO<br>SFO→JFK | 7am<br>7pm | 1<br>1 |
| P→ | 40,000<br>SPG points | ✓ | $350 | $100 | CO | B<br>B | JFK→SFO<br>SFO→JFK | 8am<br>7pm | 1<br>1 |
| U | $250 + 15,000<br>UA miles | ? | $400 | $50 | UA | B<br>B | JFK→SFO<br>SFO→JFK | 2pm<br>3pm | 0<br>0 |
| $ | $450 | ✗ | $450 | - | AA | B<br>B | JFK→SFO<br>SFO→JFK | 4pm<br>5pm | 1<br>1 |
| M | 50000<br>Sky miles | ✗ | $500 | -$50 | DL | B<br>B | JFK→SFO<br>SFO→JFK | 6pm<br>8pm | 0<br>0 |

Filters

*FIG. 8*

| Dashboard | Add / Edit Programs | Create Alerts |
|---|---|---|
| Summary | Details | | home   search  manage  analyze

Program   Value
Airline   $1000
Car       x
Credit Card  x
Hotel     x
Train     x Your account balances in 8 reward programs are valued ~ $4,800

| Type | Name | Status | Balance | $ Value | Actions |
|---|---|---|---|---|---|
| Airline | American | Gold | 100,800 miles | $1000 ($0.015 / mile) | View Detail  Go AAdvantage |
| Airline | United | none | | | |
| Car | Hertz | | | | |
| Credit Card | Amex MR | | 50,000 points | | |
| Hotel | Starwood | | | | |

*FIG. 10A*

You have $5,856 in 5 reward programs

| Program | Balance | Status | Value | Type |
|---|---|---|---|---|
| Amex Membership Rewards | 12,478 points | | $113 | Credit Card |
| American Aadvantage | 153,199 miles | Gold | $2,375 | Airline |
| Delta SkyMiles | 12,489 miles | | $182 | Airline |
| Starwood Preferred Guest | 9,134 points | | $213 | Credit Card |
| United Mileage Plus | 213,881 miles | Premier | $2,973 | Airline |

*FIG. 10B* home  search  | manage |  analyze

| Dashboard | Add / Edit Programs | Create Alerts |
| Summary  Details |

Program   Value
Airline      $3000
Car              x
Credit Card  x
Hotel           x
Train           x Your account balances in 8 reward programs are valued have ~ $4,800

| Type | Name | Status | Status: retain | Status: improve | Balance | Expire risk | $ Value | Actions |
|---|---|---|---|---|---|---|---|---|
| Airline | American | Gold | 8,852 miles / 21 segments | + 25,000 miles | 100,800 miles + 16 upgrades | Low: 1/9/2011 | $2000 ($0.015/mile) | Detail / Go AA |
| Airline | United | none | | 18,000 miles | 20,000 miles + 5 upgrades | | $1000 ($0.02/mile) | |
| Car | Hertz | | | | | | | |
| Credit Card | Amex MR | | | | 50,000 points | | | |
| Hotel | Starwood | | | | | | | |

FIG. 11

Dashboard | Add / Edit Programs | Create Alerts

Summary | Details home   search   manage   analyze

*my American Airlines AAdvantage dashboard*

Account: xxxxxx

Overview

Current Balance

| Miles | Expire | Upgrades | Expire |
|---|---|---|---|
| 100,800 | 1/9/2011 | 16 | Never |

$ Value

| Per mile | Miles | Upgrades | Total |
|---|---|---|---|
| $0.015 | $1600 | $400 | $2000 |

Program-to-Date Activity

| Miles | Upgrades |
|---|---|
| 558,00 | 30 |

Status Progress

Gold    Platinum    Executive Platinum 25K     50K         100K     16,940 miles
30      60          100      9 segments Current status = Gold Need 8,160 miles or 21 segments this calendar year to retain Gold status

Transactions

Date Range: From [  ] To [  ]

| Date | Description | Credit / Add | | Debit / Deduct |
|---|---|---|---|---|
| | | Base | Bonus | |
| 8/10/2009 | CBAA World Mastercard Purchase | 1,796 | 0 | |
| 7/9/2009 | American Airlines #2086 MIA → JFK | 2000 | 500 | |

*FIG. 12*

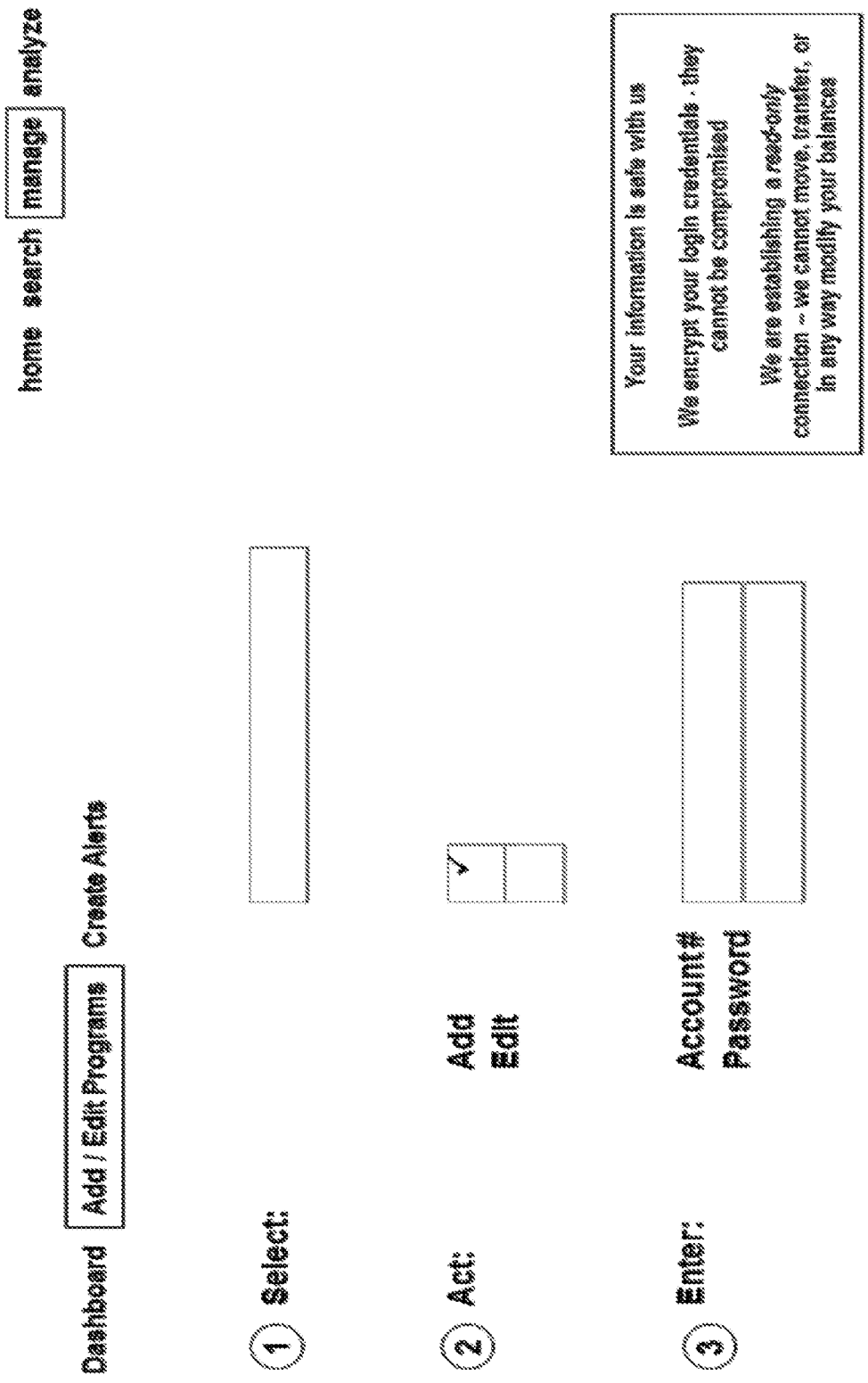

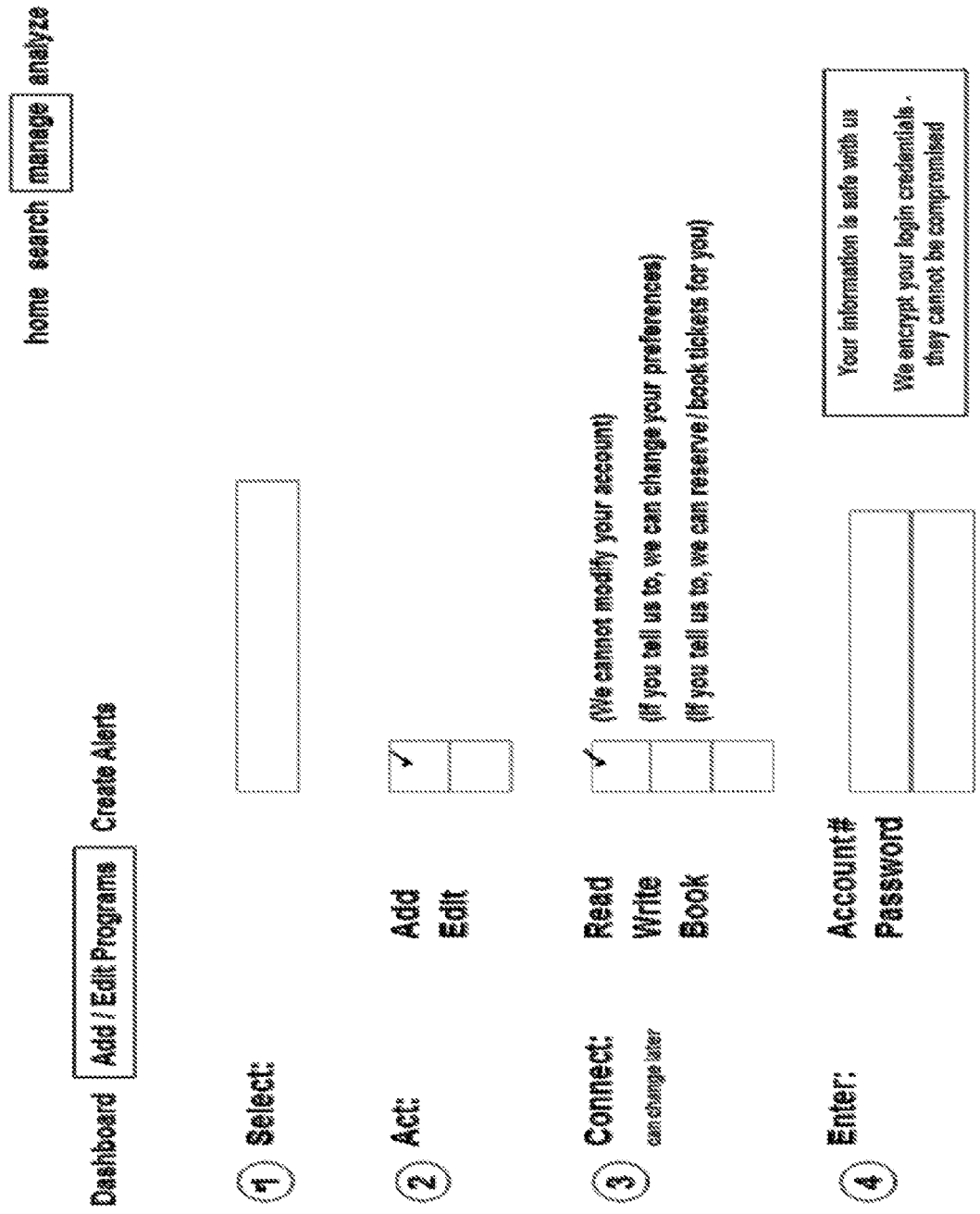

| Program | Balance | Value | Actions |
|---|---|---|---|
| Amex Membership Rewards<br>Member | 16,645<br>points | $178<br>(1.07 ¢/point) | Edit<br>Remove |
| Delta SkyMiles<br>Member | 14,584<br>miles | $219<br>(1.50 ¢/mile) | Edit<br>Remove |
| Starwood<br>Preferred Guest | 9,134<br>points | $216<br>(2.36 ¢/point) | Edit<br>Remove |
| United Mileage Plus<br>Premier | 220,427<br>miles | $3,130<br>(1.426 ¢/mile) | Edit<br>Remove |

You've got $7,167 in rewards.     X

Connect your JetBlue TrueBlue account
Don't have an account? Enroll now

Aadvantage Number
[          ]

Password
[          ]

[ Login ]  [ Cancel ]

*FIG. 14*

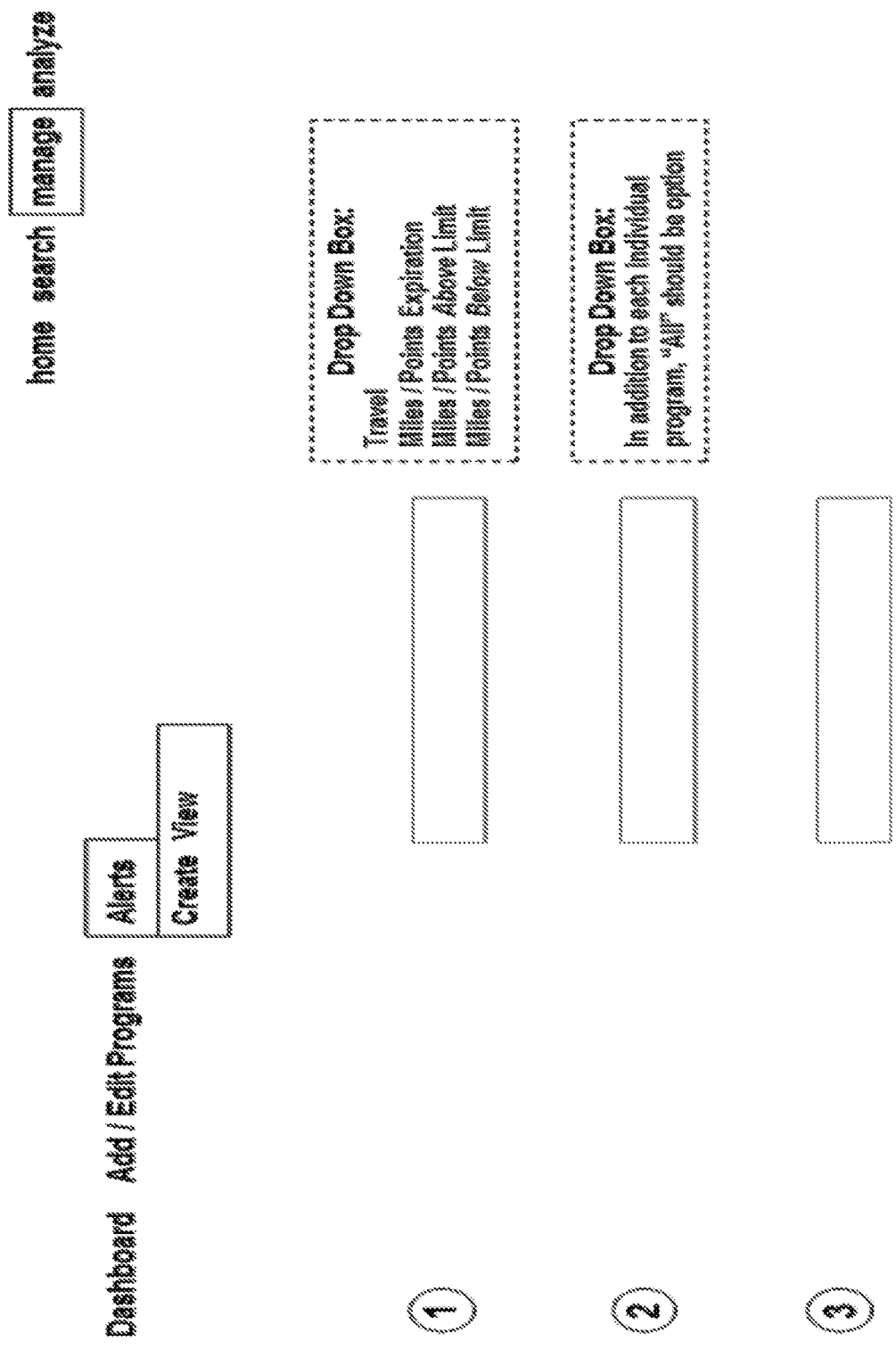
Figure 15 - Manage — Alerts: Miles/Points Expiration

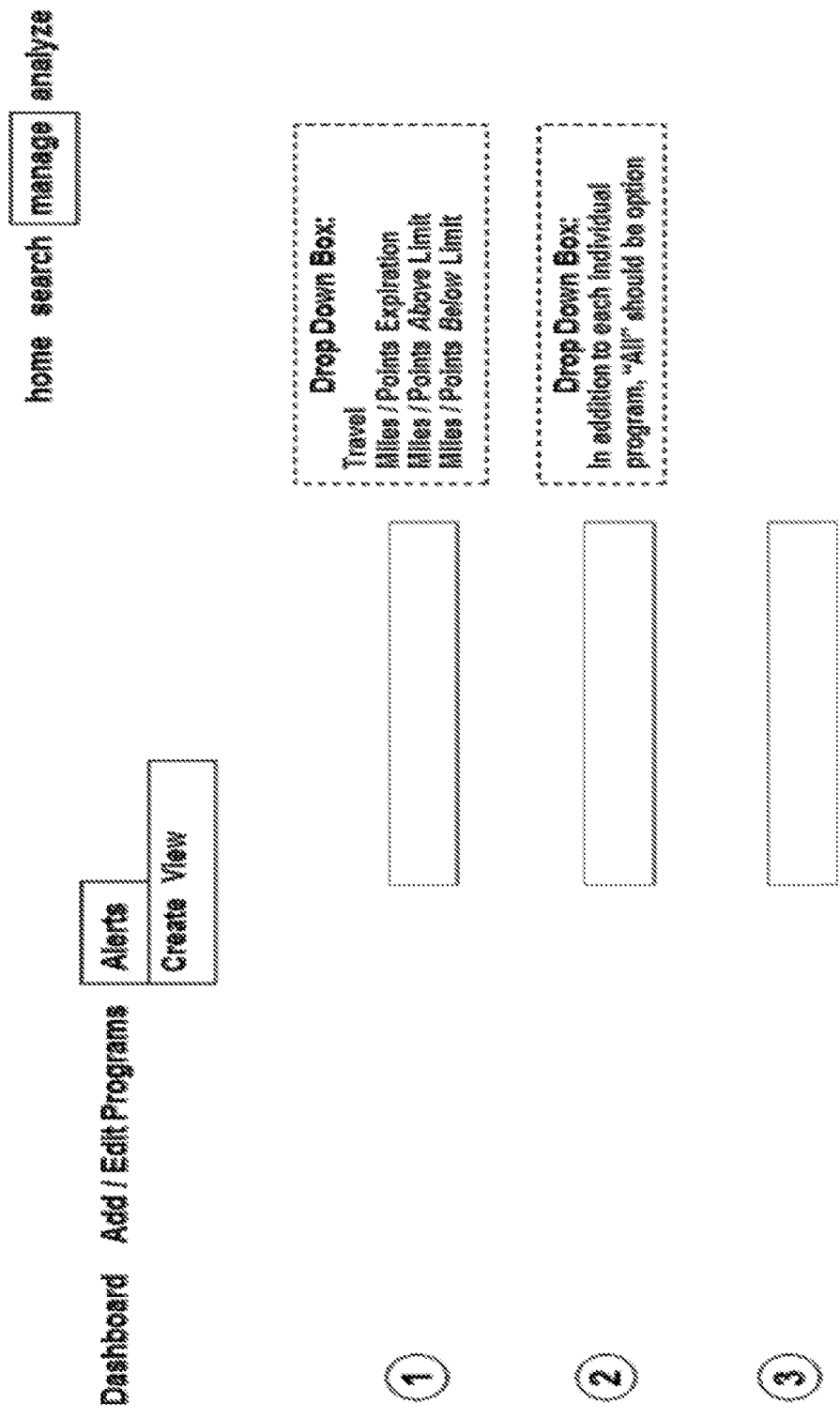

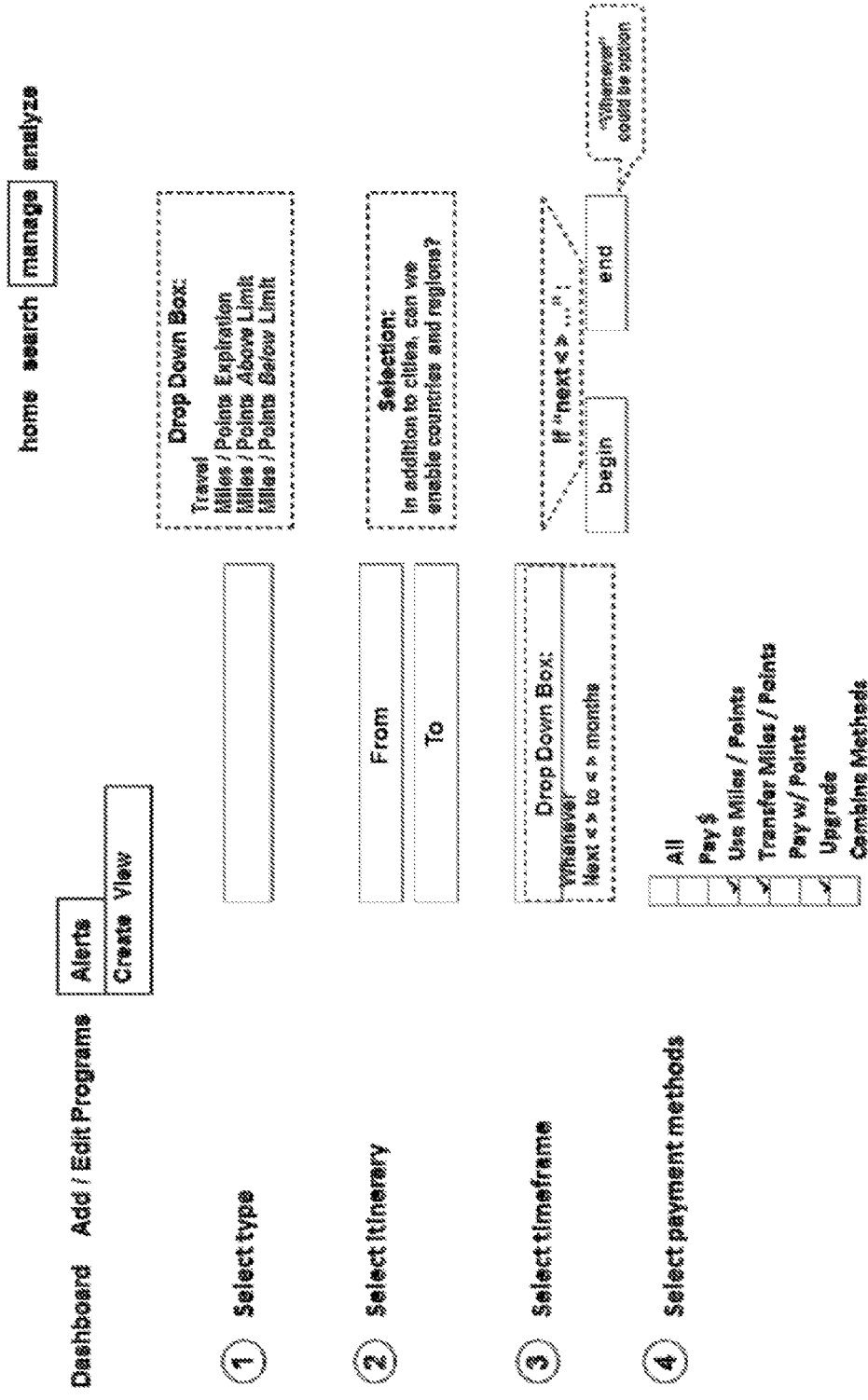
Figure 17 - Manage — Alerts: Miles/Points Travel

Figure 18 - Comparable Cost & Relative Value Calculation – "Pay $" Payment Method "Pay $" payment method: Cost & Value Analysis ☐ True Cost = $C → This ranks A of Z for this flight & cabin, B of Y for all flight, cabin & payment methods matching search criteria

| Calculation | What You Pay | | What You Receive | | True Cost |
|---|---|---|---|---|---|
| Transaction | Depart | Return | Depart | Return | |
| fare | $80 | $80 | | | $160 |
| tax | $20 | $20 | | | + $ 40 |
| booking fee | $10 | | | | + $ 10 |
| miles | | | 2,500 * E = $25 | 3,000 * E = $30 | - $ 55 |
| | | | | | = $155 |

☐ Relative Value = In the future, we'll provide fact-based perspective on whether the fare is a good value

Figure 19 - Comparable Cost & Relative Value Calculation – "Use Miles / Points" Payment Method

---

"Use Miles / Points" payment method: Cost & Value Analysis

☐ True Cost = $C → This ranks A of Z for this flight & cabin, B of Y for *all flight, cabin & payment methods matching search criteria*

| Calculation | What You Pay | | What You Receive | | True Cost | |
|---|---|---|---|---|---|---|
| | Depart | Return | Depart | Return | | |
| Transaction | | | | | | |
| miles | 10,000 * E = $80 | 10,000 * E = $80 | | | | $160 |
| co-pay | $50 | $50 | | | + | $100 |
| expedite fee | $50 | | | | + | $ 50 |
| booking fee | $10 | | | | + | $ 10 |
| | | | | | = | $320 |

☐ Relative Value = { High | In-Range | Low } → This transaction provides Qx normal {mile | point} value

| Calculation | Transaction Mile Value | | Normal Mile Value | Relative Value |
|---|---|---|---|---|
| | ("Pay $" price – "Use Miles" fees) / #M/P | | | |
| | ( $F − $G ) / P | | $E | |
| | $H | | $E | |
| | | | $E | Qx → ( High ↑↓ ) |

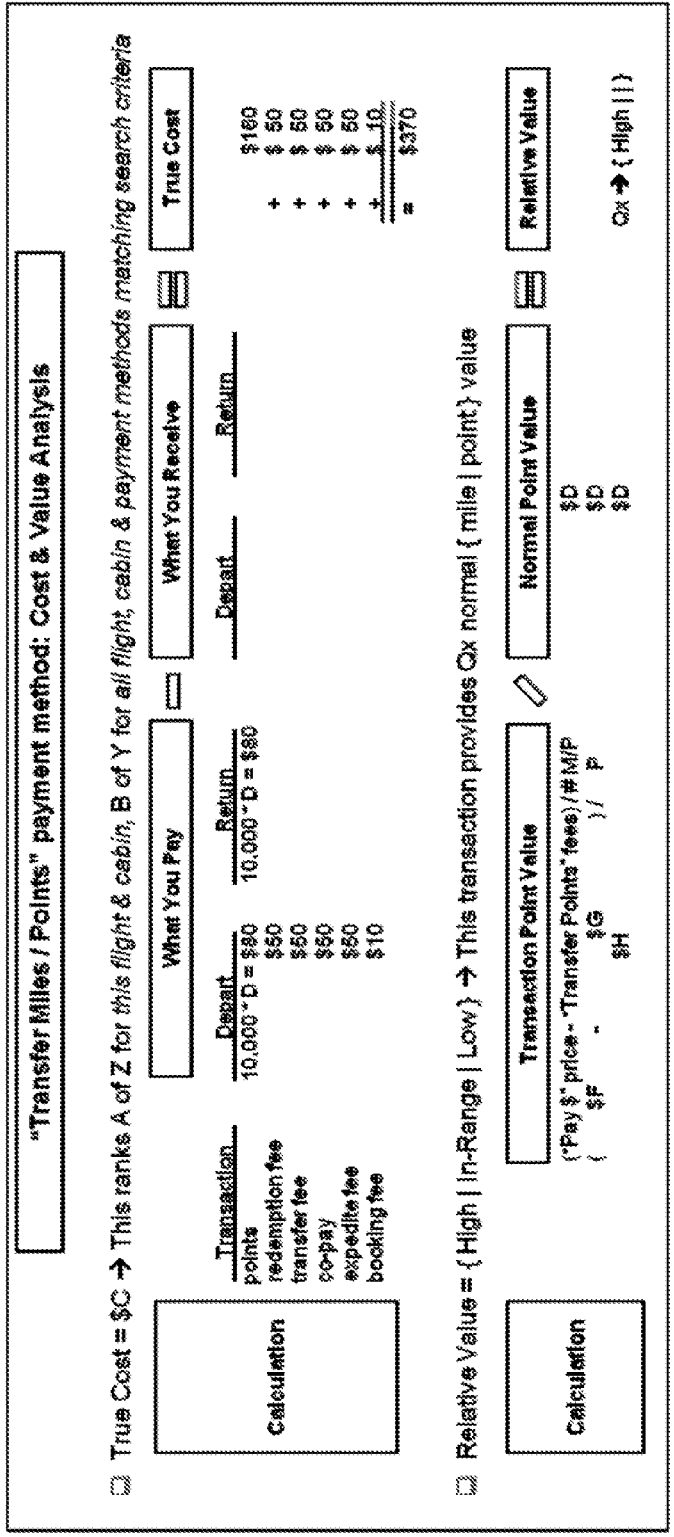
Figure 20 - Comparable Cost & Relative Value Calculation – "Transfer Miles / Points" Payment Method

Figure 21 - Comparable Cost & Relative Value Calculation — "Pay w/ Points" Payment Method "Pay w/Points" payment method: Cost & Value Analysis ☐ True Cost = $C → This ranks A of Z for this flight & cabin, B of Y for all flight, cabin & payment methods matching search criteria

Calculation

What You Pay

| Depart | Return |
|---|---|
| 10,000 * D = $80 | 10,000 * D = $80 |
| redemption fee $50 | |
| expedite fee $50 | |

Transaction: points, redemption fee, expedite fee, miles

What You Receive

| Depart | Return |
|---|---|
| 2,500 * E = $25 | 3,000 * E = $30 |

True Cost $160
+ $ 50
+ $ 50
- $ 55
= $205

☐ Relative Value = { High | In-Range | Low } → This transaction provides Qx normal point value

Calculation

Transaction Point Value ("Pay $" price - "Pay w/ Points" fees + miles value) / # points
( $F  -  $G  +  $H  ) / P
$I Normal Point Value $D
$D
$D Relative Value Qx → { High | }

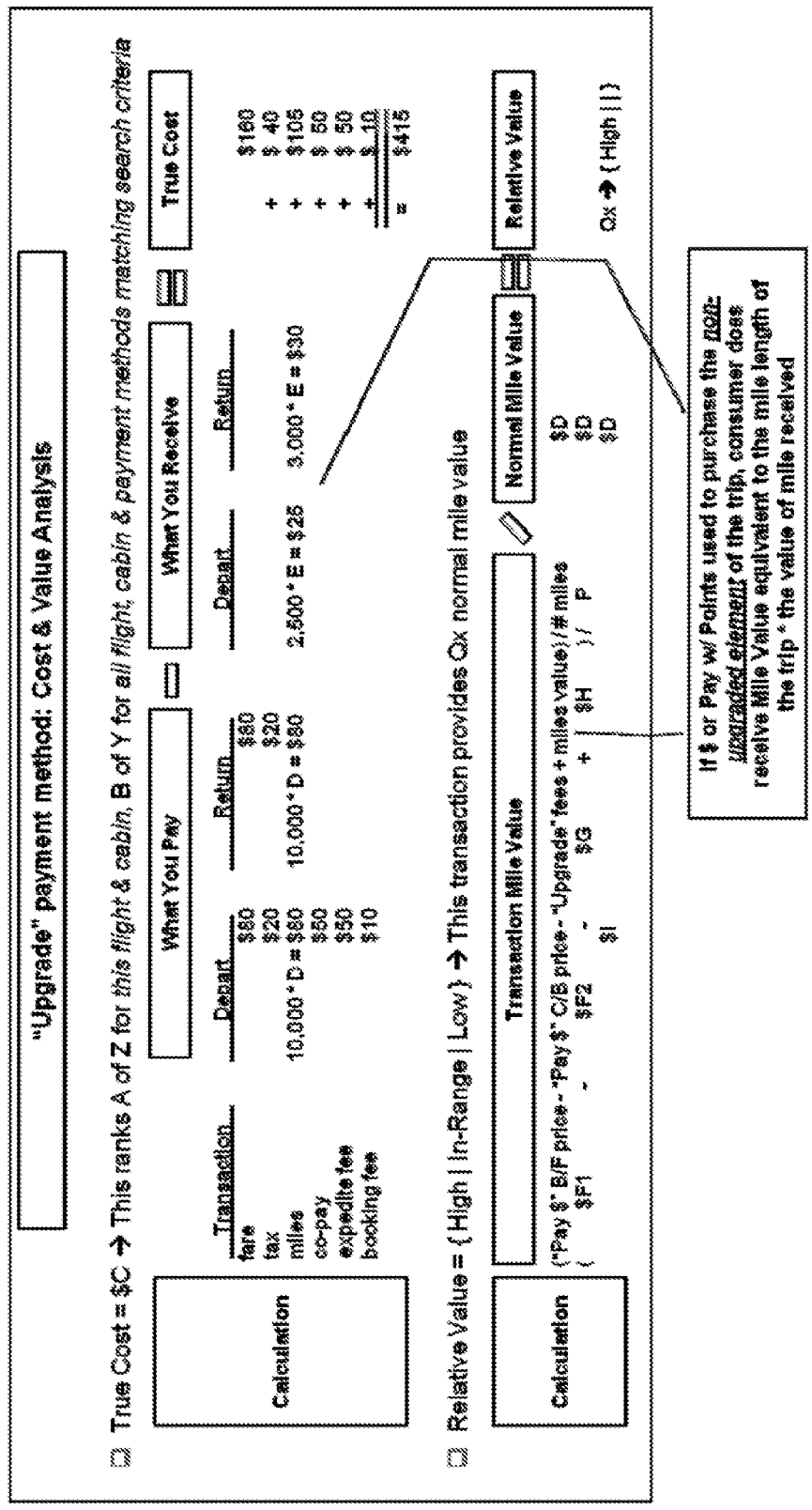
Figure 22 - Comparable Cost & Relative Value Calculation – "Upgrade" Payment Method

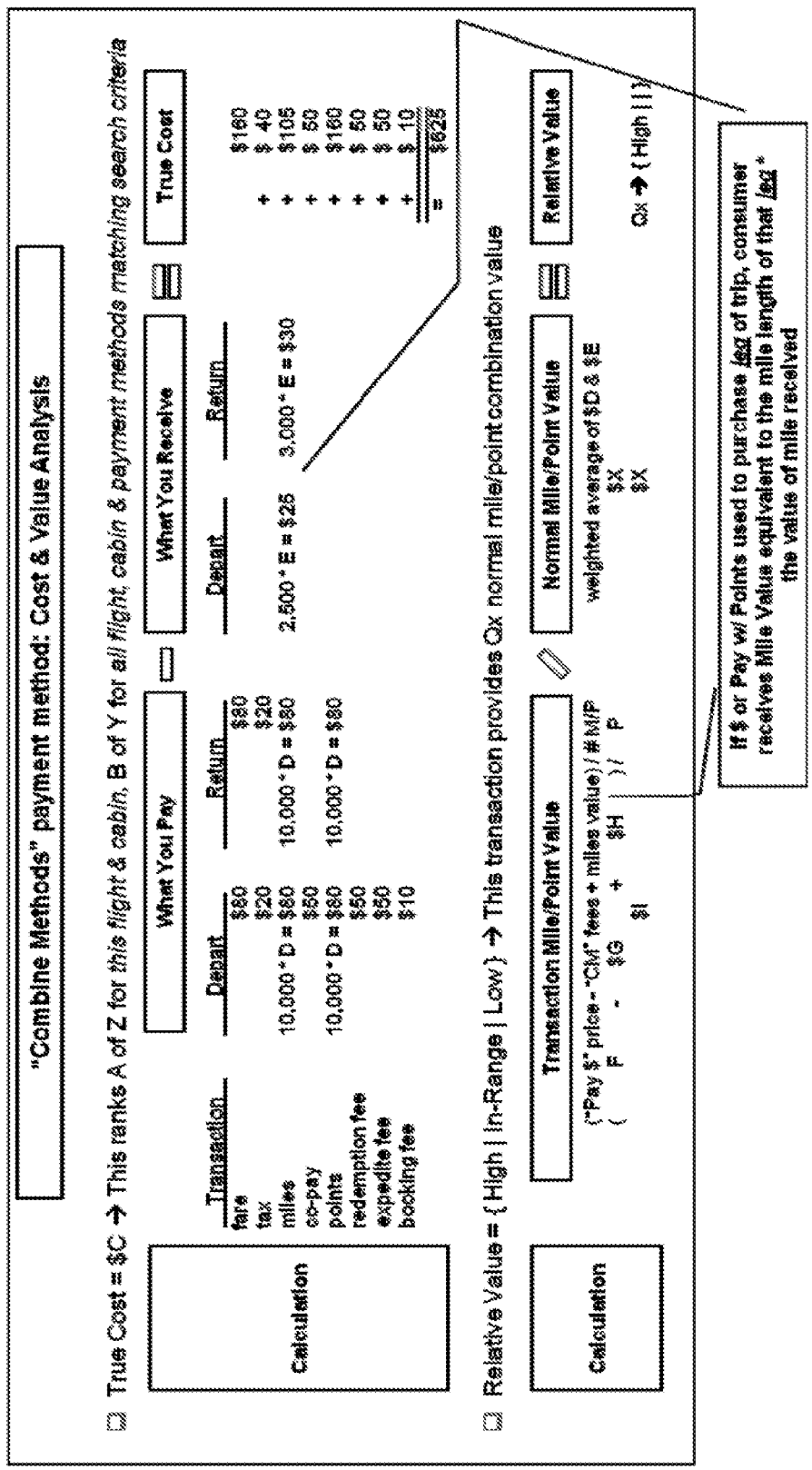
Figure 23 - Comparable Cost & Relative Value Calculation – "Combine Methods" Payment Method

Figure 24 - Analysis Panel – Hover Text

➢ True Cost: A measure to determine how much each payment method really costs – we do this by converting all payment methods into $ ➢ Relative Value: A measure to determine how much value you receive in this transaction compared to what you normally receive, or expect to receive ➢ D: Each { Amex | Starwood | ...} point is worth about $D to {the average user | you} when redeemed
   click here to { personalize | change this value }

➢ E: Each { American | Delta | ...} mile is worth about $E to {the average user | you} when redeemed
   click here to { personalize | change this value }

➢ Weighted Average of D & E:
   Each { Amex | Starwood | ...} point is worth about $D to {the average user | you} when redeemed
   Each { American | Delta | ...} mile is worth about $E to {the average user | you} when redeemed
   click here to { personalize | change this value }

We calculate the blended value of these 2 sources

Figure 25 - Analysis Panel – Hover Text II

- "Pay $" price - "Pay w/ Points" fees: The "Pay $" price (fare + tax + fees) minus any fees for using "Pay w/ Points", represents the $value that points are being redeemed for in this transaction

- "Pay $" price - "Pay w/ Points" fees + miles value: The "Pay $" price (fare + tax + fees) minus any fees for using "Pay w/ Points" plus miles received, represents the value that points are being redeemed for in this transaction

- "Pay $" price - "Use Miles" fees: The "Pay $" price (fare + tax + fees) minus any fees for using "Use Miles" represents the $value that miles are being redeemed for in this transaction

- "Pay $" price - "Transfer Points" fees: The "Pay $" price (fare + tax + fees) minus any fees for using "Transfer Points", represents the $value that points are being redeemed for in this transaction

- "Pay $" B/F price - "Pay $" C/B price - "Upgrade" fees + miles value: The "Pay $ B/F - C/B" price differential (fare difference + tax + fees) minus any fees for using "Upgrade" plus miles received, represents the value that miles are being redeemed for in this transaction

Figure 26 - Recommendation option A – "Pay w/ Points" Payment Method

- This is the {cheapest | 2nd cheapest | questionable | poor} one of the more expensive | most expensive} payment options.

- This transaction is a {good | questionable | poor} deal:
  - You are getting a value of X cents per point
    - calculation = ("pay w/ cash" option price – any cash fees) / # points required
    - {Amex | Starwood | ...} set an exchange rate of 1 point = 1 cent, but there are additional fees that you are paying which lower your exchange value to X cents per point
      To learn more click here
  - Your {Amex | Starwood | ...} points, on average, provide you with a value of Y cents per point

- This payment includes:

| | One Way | Departure Segment | Return Segment |
|---|---|---|---|
| points required | | x | x |
| redemption fee | | y | y |
| expedite fee | | y | y |
| co-pay | | y | y |
| xxx | | y | y |

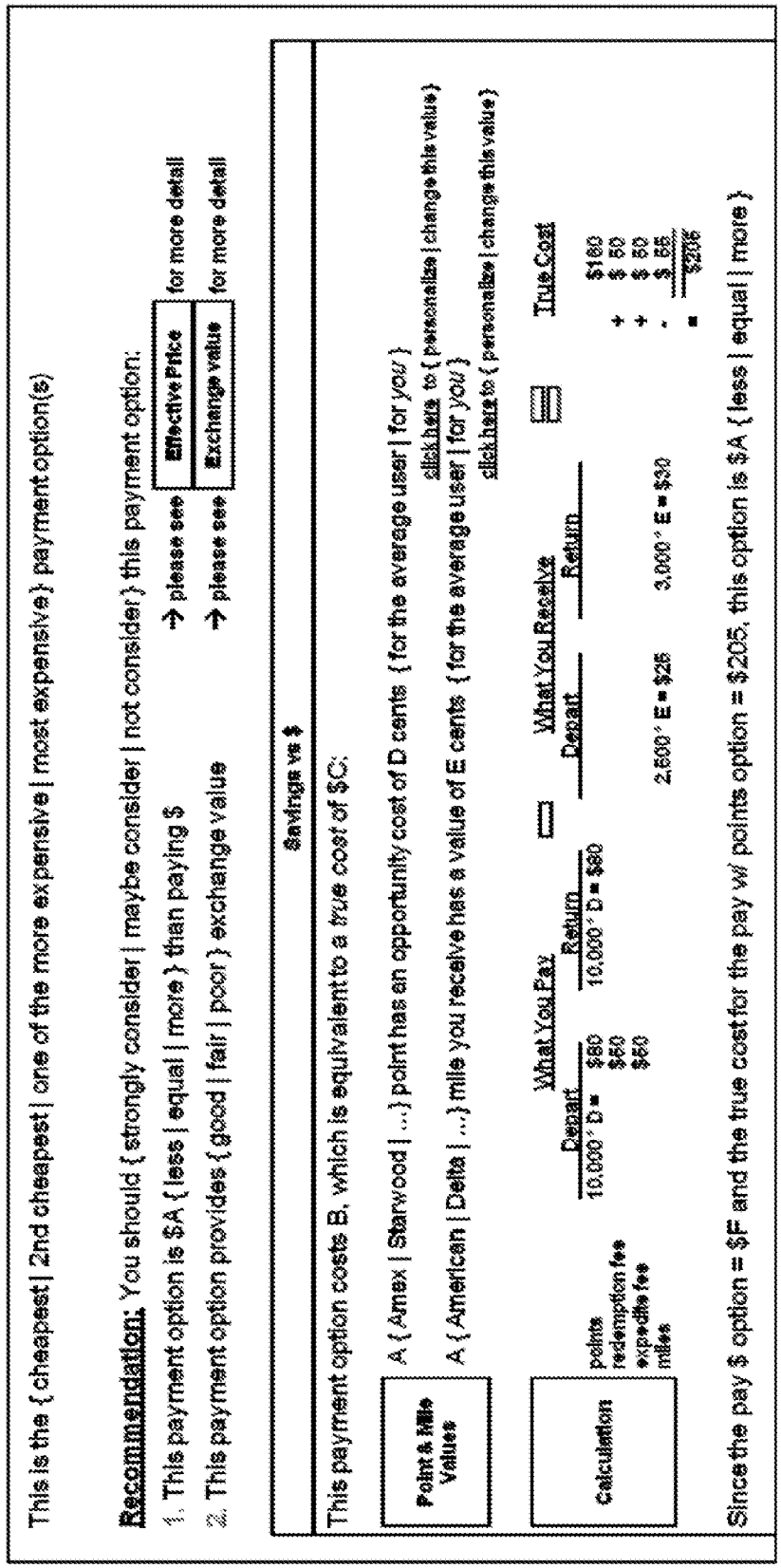
Figure 27 - Recommendation option B — "Pay w/ Points" Payment Method

Figure 28 - Recommendation option B continued — "Pay w/ Points" Payment Method

| Exchange value |
|---|
| This payment option provides you with H cents { more \| equal \| less } exchange value than { you \| one } normally receive<br><br>-- You are receiving a value of I cents per point<br>  -- { Amex \| Starwood \| ... } set an exchange rate of 1 point = 1 cent, but your actual exchange value differs due to fees<br>  -- Calculation = ( the "pay w/ cash" option price - any fees) / # points required<br>      I = (    $F   -   $100   ) /   20,000<br><br>-- A { Amex \| Starwood \| ... } point, on average, provides { users \| you } with a value of D cents per point<br>                                                            <u>click here</u> to { personalize / change this value }<br><br>Since I is { < \| = \| > } D, this payment option provides { good \| fair \| poor } exchange value |

Figure 29 - Booking Instructions – Pay $ | Use Miles / Points | Combine Methods Use one of the options below to *payment method X* to book *flight Y*:

| Automatically via MileWise | booking fees = $TBD | time required = 1 minute |

| Manually via airline web site | booking fees = $X | time required = 2-5 minutes |

| Call airline agent from your PC | booking fees = $Z | time required = 5-30 minutes |

| Manually call airline agent | booking fees = $Z | time required = 10-45 minutes |
-- dial: xxx – xxx – xxxx
-- after connecting, press x, enter frequent flyer #, press y, ...

Figure 30 - Booking Instructions – Upgrade

Use one of the options below to book *an upgrade for flight Y*:

| Automatically via MileWise | booking fees = $TBD | time required = 1 minute |

| Call airline agent from your PC | booking fees = $Z | time required = 5-30 minutes |

| Manually call airline agent | booking fees = $Z | time required = 10-45 minutes |
| — dial: xxx – xxx – xxxx | | |
| — after connecting, press x, enter frequent flyer #, press y, ... | | |

Figure 31 - Booking Instructions – Transfer Miles / Points

Use one of the options below to *transfer points* to book *flight Y*:

| Automatically via MilesWise | booking fees = $TBD | time required = 2 minutes |
|---|---|---|

| Manually transfer points @ rewards site<br>— authorize transfer to airline ff program<br>— then book flight via airline web site or agent | booking fees = $X | time required = 10 minutes |
|---|---|---|

| Call rewards agent from your PC<br>— authorize transfer to airline ff program<br>— then book flight via airline web site or agent | booking fees = $Z | time required = 10-30 minutes |
|---|---|---|

| Manually call rewards agent<br>— dial: xxx – xxx – xxxx<br>— after connecting, press x, enter rewards program id, press y, …<br>— authorize transfer to airline ff program<br>— then book flight via airline web site or agent | booking fees = $Z | time required = 15-60 minutes |
|---|---|---|

Figure 32 - Booking Instructions – Pay w/ Points

Use one of the options below to Pay w/ Points for *flight Y*:

| Automatically via MileWise | booking fees = $TBD | time required = 1 minute |

| Manually pay w/ points via rewards site | booking fees = $X | time required = 2-10 minutes |
—  enter search parameters to locate flight
—  execute transaction

| Call rewards agent from your PC | booking fees = $Z | time required = 10-30 minutes |
—  instruct agent to find same flight
—  authorize transaction

| Manually call rewards agent | booking fees = $Z | time required = 15-60 minutes |
—  dial: xxx – xxx – xxxx
—  after connecting, press x, enter rewards program id, press y, ...
—  instruct agent to find same flight
—  authorize transaction

We're working hard to improve booking.
For now here are instructions!

1. Click [Book Flight] to visit Starwood Preferred Guest online
2. Enter your SPG number and password, then click Sign In
3. Select American from the dropdown box
4. Enter your frequent flyer number
5. Enter 20,000 and click continue
6. Once the transfer is complete (could take between 1 and 14 days):
7. [Click Here] to go to American's website
8. Check AAdvantage Redeem Miles checkbox
9. Enter your search parameters to find, select, and purchase flight:
   1. Origin: New York, NY (JFK)
   2. Destination: San Francisco, CA (SFO)
   3. Departing: 6:00p Jun 7, 2011 on AA Flight 177
10. Complete checkout to book flight for 25,000 miles and $0 *per person*

[ Book ]  [ Cancel ]

---

We're working hard to improve booking.
For now here are instructions!

1. Click [Book Flight] to visit Amex Membership Rewards online
2. On top left of page, enter your American Express credit card user id and password and click Login
3. On left side of page, click Book Your Trip
4. Enter the following search parameters:
   1. Origin: New York, NY (JFK)
   2. Destination: San Francisco, CA (SFO)
   3. Departing: 6:00p Jun 7, 2011 on AA Flight 177
5. Click Advanced Search: One-way
6. Select outbound flight
7. Click CONTINUE WITH FLIGHT ONLY
8. Select Use All Points and click CONTINUE
9. Enter passenger information and click CONTINUE
10. Enter seat preference and click CONTINUE
11. Click Complete your Purchase to book flight for 16,169 Amex points *per person*

American Express Membership Rewards pricing is for MR Standard and First tiers. It's twice as expensive to redeem Express points for flights. If you are an Express member, consider [upgrading your card].

[ Book ]  [ Cancel ]

*FIG. 33 Continued*

We're working hard to improve booking.
For now here are instructions!

1. Dial 1-800-433-7300
2. Say Award Travel
3. Say New Reservations
4. Say your AAdvantage account number
5. Say airport code JFK
6. Say Jun 15, 2011
7. Per upgrade, speak with agent to purchase $355 coach class seat and pay 15,000 miles to confirm upgrade.

While we have ensured this flight is eligible for an upgrade, we can't guarantee availability. But we're working on it!

[ Book ]   [ Cancel ]

*FIG. 33 Continued*

Please wait while we hold an award seat for you ....

NOTE: We are not actually booking the seat. You will still have to confirm that you want to purchase the seat using your miles at the airline's website.

Once your reservation is confirmed you will receive an email from the airline.

We successfully reserved an award seat for you! Record Locator: LDKYTF

| milewise | Search Flights | Manage Rewards | | welcome sanjay@milewise.com | | Logout |
|---|---|---|---|---|---|---|
| NYC to ATL departing May 18 | ✎modify | | | | Personalize | On |

▶ Reward Balances
American 167,307
Amex 16,645
Delta 19,106
Starwood 19,134
United 220,427

⊕ Add Reward Programs

▶ Airline
☑ American $91
☑ Delta $104
☑ United $120
▶ Program
☑ Amex $175
☑ Starwood $336
▶ Payment Method
☑ cash $91
☑ miles $180
☑ points $175
☑ transfer $434
▶ upgrade $351
▶ Flight Times
depart flight (take-off)
12:00a - 11:59p
▷ Cabin
☑ coach $91
☑ business/first $291
▷ first
▷ Stops
☑ nonstop $91
☑ 1 stop $120
☐ 1+ stops

| Flight Details | Cash ▼ | Miles ▼ | Points ▼ | Transfer ▼ | Upgrade ▼ |
|---|---|---|---|---|---|
| ✈ American<br>LGA 6:00a → ATL 8:20a | Best Overall<br>$115<br>Cash | 12,500<br>American miles | 12,169<br>Amex points | 12,500<br>Starwood points | |
| ⊙ Net Value | $91 | $195 | $175 | $434 | |
| ⊙ Relative Value | | -41% | -31% | -74% | |
| ✈ American<br>LGA 6:00a → ATL 8:20a | Best Overall<br>$115<br>Cash | 12,500<br>American miles | 12,169<br>Amex points | 12,500<br>Starwood points | |
| ⊙ Net Value | $91 | $195 | $175 | $434 | |
| ⊙ Relative Value | | -41% | -31% | -74% | |
| ✈ American<br>LGA 6:00a → ATL 8:20a | Best Overall<br>$115<br>Cash | 12,500<br>American miles | 12,169<br>Amex points | 12,500<br>Starwood points | |
| ⊙ Net Value | $91 | $195 | $175 | $434 | |
| ⊙ Relative Value | | -41% | -31% | -74% | |
| ✈ American<br>LGA 6:00a → ATL 8:20a | Best Overall<br>$115<br>Cash | 12,500<br>American miles | 12,169<br>Amex points | 12,500<br>Starwood points | |
| ⊙ Net Value | $91 | $195 | $175 | $434 | |
| ⊙ Relative Value | | -41% | -31% | -74% | |
| ✈ American<br>LGA 6:00a → ATL 8:20a | Best Overall<br>$115<br>Cash | 12,500<br>American miles | 12,169<br>Amex points | 12,500<br>Starwood points | | hi sanjay [preferences] [sign out]

milewise    results for NYC to SFO on Tue Apr 05   [edit search]

| Airline Programs Best WisePrice |
| --- |
| ☑ American  $59 |
| 170,699 miles ($2,659 value) |
| ☑ Delta  $102 |
| 14,584 miles ($214 value) |
| ☑ United  $134 |
| 232,937 miles ($3,255 value) |
| ☑ US Airways  $115 |
| 0 miles ($0 value) |
| ☑ Jetblue  $165 |
| Card Programs |
| ☑ Amex  $160 |
| 16,645 points ($272 value) |
| ☑ Starwood  $431 |
| 9,134 points ($317 value) |
| [ Add Reward Programs ] |
| Stops |
| ☑ Nonstop  $59 |
| ☑ 1 stop  $62 |
| ☑ 2 stops  $354 |
| Cabin |
| ☑ Coach  $59 |
| ☑ Business  $354 |
| ☑ First  $320 |
| Takeoff Time- New York |
| 12:00a       11:59p |
| New York Airports |
| ☑ EWR Newark, NJ  $120 |
| ☑ HPN White PLains, NY  $389 |
| ☑ JFK New York, NY  $320 |
| ☑ LGA New York, NY  $62 |
| San Francisco Airports |
| ☑ SFO San Francisco, CA  $62 |
| Payment Method |
| ☑ cash  $59 |
| ☑ miles  $165 |
| ☑ points  $160 |
| ☑ transfer  $270 |
| ☑ upgrade  $320 |

| Cash ▼ | Miles ▼ | Points ▼ | Transfer ▼ | Upgrade ▼ |
| --- | --- | --- | --- | --- |
| $140 Cash $59 WisePrice Select | 12,500 American $195 WisePrice Select | 14,669 Amex $160 WisePrice Select | 12,500 Starwood $434 WisePrice Select | call agent at 1800-433-7300 |

American JFK 7:25a → SFO 10:45a  3h 20m  0 stops  Coach  details

| $140 Cash $59 WisePrice Select | 12,500 American $195 WisePrice Select | 14,669 Amex $160 WisePrice Select | 12,500 Starwood $434 WisePrice Select | call agent at 1800-433-7300 |

American JFK 9:30a → SFO 12:55p  3h 25m  0 stops  Coach  details

| $140 Cash $59 WisePrice Select | 12,500 American $195 WisePrice Select | 14,669 Amex $160 WisePrice Select | 12,500 Starwood $434 WisePrice Select | call agent at 1800-433-7300 |

American JFK 6:00p → SFO 9:35p  3h 35m  0 stops  Coach  details

| $140 Cash $59 WisePrice Select | 12,500 American $195 WisePrice Select | 14,669 Amex $160 WisePrice Select | 12,500 Starwood $434 WisePrice Select | call agent at 1800-433-7300 |

American JFK 7:30p → SFO 11:05p  3h 35m  0 stops  Coach  details

| $140 Cash $59 WisePrice Select | 25,000 American $389 WisePrice Select | 14,669 Amex $160 WisePrice Select | 20,000 Starwood $694 WisePrice Select | call agent at 1800-433-7300 |

American JFK 3:30p → SFO 6:55p  3h 25m  0 stops  Coach  details

PAYMENT METHOD DECISION ENGINE

FIELD

The present disclosure relates to the field of reward programs, and more particularly to apparatus, systems, and methods for comparison of offers.

BACKGROUND

In today's competitive world, sellers of goods and services seek to take advantage of many marketing opportunities to increase their sales, advance their market share, and achieve greater profitability. These results should be achieved without cutting prices and without appearing to be a "discounter" or seller of distressed products. Thus, over the past fifty years, new types of incentives have appeared in the form of reward programs or rewards programs. These programs offer incentives to buyers to purchase the products or services offered, without lowering prices and without discounting the merchandise.

Examples of such programs are manifest. Some credit card companies offer cash back, the sum rebated depending on the user's purchases over a period of time. Other credit card companies offer alternative rewards in the form of miles, points, credits, or other currency units, based on the credit card holder's use of the card. Hotel chains offer points, often for free lodging or other incentive, based on the user's purchases. Airlines offer frequent flyer miles based on the trips purchased and flown by the traveler. One unique aspect of some of these programs is that the incentive or benefit generally accrues to the traveler, rather than to the person or company purchasing the product or service, e.g., the user's employer. The user thus has an incentive to purchase products or services from selected providers because of the benefits provided in exchange for the accrued frequent flyer miles, credit card points, or other reward program currency units.

One provider typically cannot meet all of the user's needs or desires in a given category of goods or services. Therefore a typical user may participate in several such plans, such as two or more airlines that fly to different locations, two or more major credit cards that are accepted in different establishments, two hotel chains with different locations, and so forth. It is difficult to keep track of one's points, miles or other "earnings" under a plurality of such plans. Adding to the complexity is that merchants and providers may have "partners," who honor each other's rewards. Thus, an airline may accept credit card points or hotel credits, while hotels may accept credit card points, and so forth.

A user wishing to redeem accumulated points, miles or credits must search carefully and diligently for opportunities to redeem the points, even if he or she goes only to the merchant or provider of the goods or services. The user will be diligent because these credits are literally equivalent to his or her cash. The user also has to be diligent because there are many rules that apply to these redemptions that further complicate actually determining the availability and prices. The user wishes to make the best possible use of the points and to get the lowest price for the purchase he or she wishes to make. Prices at the merchants, however, are usually quoted only in cash, with searching required to find the equivalent price in frequent flier miles, credit card points, and the like.

This information may also take the form of prices for other goods and services in these alternate currencies. While such information is available, is it not conveniently available without a great many searches, often to several vendors if one is determined to get reasonable value for the points of miles. What is needed is a way to gather information from many merchants and providers on the prices they offer and the values they provide for these alternate currencies.

SUMMARY

The exemplary methods and systems disclosed herein include a computerized comparison shopping engine that presents to users the best offers in terms of lower price, lower cost, and higher value and enables users to compare offers that may be in one of multiple, distinct payment currencies. The currencies may include various elements and combinations of cash or credit card payments, redemption of reward program miles, points, credits, or other units, transfer of reward program units, upgrades, and the like. In various embodiments the disclosure further relates to systems and methods for determining availability, lowest prices, comparable costs, relative values, other relevant analyses, and facilitating or executing a purchase of a product or service via any one of multiple payment methods, including forms of "currency" such as foreign currency, domestic currency, real currency, virtual currency, cash, checks, wire transfers, credit, debit, miles, points, credits, certificates, gift cards, commitments to undertake specific actions, and other potential payment methods and currencies as disclosed throughout this disclosure or as understood by one of ordinary skill in the art.

One embodiment is a method. The method includes steps of accepting a request from a user to find a product or a service, and in response to the request, conducting a computerized search for prices for the product or service. The method also includes a step of calculating a plurality of results in at least two currencies for the product or service, wherein at least one of the currencies is a currency for a rewards program, and presenting at least one result of the search.

Another embodiment is also a method. The method includes steps of accepting a request from an on-line user to find a product or a service, in response to the request, conducting a computerized search to find price information for the product or service. The method also includes steps of calculating results in at least two currencies for the product or service, wherein at least one of the currencies is a currency for a rewards program, and presenting at least one result of the search to the on-line user, wherein the results of the search are based on at least one of historical usage data from the user, a desired future usage by the user, historical usage data from at least one rewards program, and a status of the user.

One embodiment is a computer program embodied on a computer-readable medium for conducting a search for a product or service. The computer program contains code segments for a number of steps. There are codes segments for receiving a search request from a user to find a product or a service, for conducting a computerized search to determine a price for the product or service, in response to the request, and for presenting at least one result of the search to the user, wherein the computer program further comprises a code segment for calculating results in at least two currencies for the product or service, wherein at least one of the currencies is a currency for a rewards program.

A further embodiment includes a system. The system includes a computer, a user database connected to the computer, the user database comprising information of a plurality of users concerning user preferences for products, services and at least one rewards program, a rules database connected to the computer, the rules database comprising information of a plurality of merchants and providers of products and services, said rules database also comprising information for rewards programs of the plurality of merchants and providers.

The system also includes a computer program embodied on a computer-readable memory accessible to the computer, the computer program comprising a search engine for searching for prices for the products and services, and a pricing engine for calculating prices, values and costs for the products and services, wherein the computer program is adapted to calculate prices for at least one product or service in at least two currencies, wherein at least one of the currencies is a currency for a rewards program, and to present results of the searching.

BRIEF DESCRIPTION OF THE DRAWINGS

Further features and advantages of the present disclosure can be ascertained from the following detailed description that is provided in connection with the drawings described below:

FIG. 2 depicts an exemplary System Schematic;

FIG. 3 is an example of an exemplary Process Flow Chart;

FIG. 4 is an example of one embodiment of a Personalization Survey: Detailed Inquiry;

FIG. 5 is another embodiment of the Personalization Survey: Brief Inquiry;

FIG. 6A is an example of one embodiment of the Search Results Page—Flight View: page 1;

FIG. 6B is an example of one embodiment of the Search Results Page—Flight View: page 2;

FIG. 6C is an example of one embodiment of the Search Results Page—Flight View: page 3;

FIG. 6D is an example of one embodiment of the Search Results Page—Flight View: Business & First Class;

FIG. 7A is an embodiment of the Search Results Page—Flight View: Price Analysis;

FIG. 7B is an example of one embodiment of the Search Results Page—Flight View: Price Analysis—comparable cost hover text;

FIG. 7C is an embodiment of the Search Results Page—Flight View: Price Analysis—relative value hover text;

FIG. 8 is an example of one embodiment of the Search Results Page—Payment View A;

FIG. 10A is an example of one aspect of the Manage—Dashboard: Summary View—Basic, in a first embodiment;

FIG. 10B is an example of one aspect of the Manage—Dashboard: Summary View—Basic, in a second embodiment;

FIG. 11 is an example of one aspect of the Manage—Dashboard: Summary View—Advanced;

FIG. 12 is an example of one aspect of the Manage—Dashboard: Detail View;

FIG. 13A is an example of one aspect of the Manage—Add Program: Initial version;

FIG. 13B is an example of one aspect of the Manage—Add Program: Long-term version;

FIG. 14 is an example of a Manage—Add Program and Balance View;

FIG. 15 is an example of one aspect of the Manage—Alerts: Miles/Points Expiration;

FIG. 16 is an example of one aspect of the Manage—Alerts: Miles/Points Limit;

FIG. 17 is an example of one aspect of the Manage—Alerts: Miles/Points Travel;

FIG. 18 is an example of one aspect of the Comparable Cost & Relative Value Calculation—"Pay $" Payment Method;

FIG. 19 is an example of one aspect of the Comparable Cost & Relative Value Calculation—"Use Miles/Points" Payment Method;

FIG. 20 is an example of one aspect of the Comparable Cost & Relative Value Calculation—"Transfer Miles/Points" Payment Method;

FIG. 21 is an example of one aspect of the Comparable Cost & Relative Value Calculation—"Pay w/Points" Payment Method;

FIG. 22 is an example of one aspect of the Comparable Cost & Relative Value Calculation—"Upgrade" Payment Method;

FIG. 23 is an example of one aspect of the Comparable Cost & Relative Value Calculation—"Combine Methods" Payment Method;

FIG. 24 is an example of one aspect of the Analysis Panel—Hover Text I;

FIG. 25 is an example of one aspect of the Analysis Panel—Hover Text II;

FIG. 26 is an example of one embodiment of the Recommendation option A—"Pay w/Points" Payment Method;

FIG. 27 is an example of one embodiment of the Recommendation option B—"Pay w/Points" Payment Method;

FIG. 28 is an example of one embodiment of the Recommendation option B continued—"Pay w/Points" Payment Method;

FIG. 29 is an example of one embodiment of the Booking Instructions—Pay $|Use Miles/Points| Combine Methods;

FIG. 30 is an example of one embodiment of the Booking Instructions—Upgrade;

FIG. 31 is an example of one embodiment of the Booking Instructions—Transfer Miles/Points;

FIG. 32 is an example of one embodiment of the Booking Instructions—Pay w/Points;

FIG. 34 is an example of a seamless reservation notification;

FIGS. 35-37 are embodiments of alternate user interfaces.

DETAILED DESCRIPTION

Figure 1:
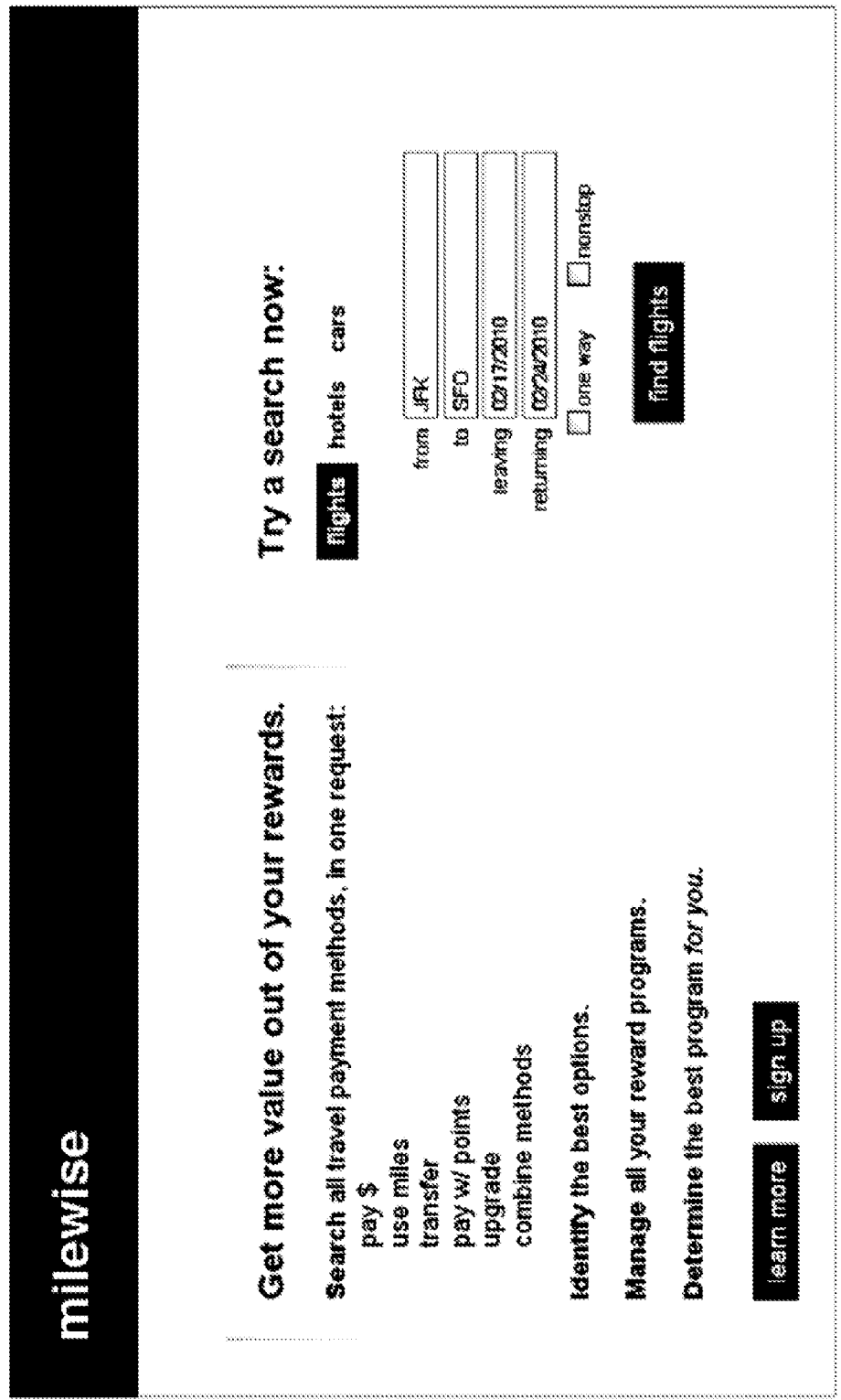
FIG. 1 depicts an example of a home page with a non-signed-in user submitting a product search.

One aspect of the present disclosure enables a user to perform and receive an enhanced product search, review, analysis, and/or purchase experience. Embodiments may be implemented and run in a variety of manners. In one embodiment, a user submits an online (Internet-based) search request for a product, and in turn is presented with a number of alternatives, including the best available payment currency for that product. The currencies may include various elements and combinations of cash or credit card payments, redemption of reward program miles, points, credits, or other units, transfer of reward program units, upgrades, and the like.

In the present disclosure, the following words may have the associated meanings "Product" may include a product and/or service, which may include hard goods, virtual goods, digital media, software, software as a service, or a wide range of other types of goods or services. "Price" may include the consideration or terms of payment for a product or products, which may include upfront consideration, future consideration, lease payments, commitments to a period of service, cash, a promise to undertake an action, or the like, and may factor in an amount of currency (real or virtual), time periods of commitment (e.g., to a service contract), interest rates, discounts, and a wide range of other terms and conditions that potentially affect the value exchanged for a product or service. "Discounts" means any reduction in the value, price or consideration required by a merchant in exchange for providing a product, such as to provide an incentive for a consumer to purchase, lease, license, or otherwise obtain the product, and may take many forms, such as a price reduction, a discount, a volume discount, a reduction in a commitment period, a rebate, a promotion, a deal, a coupon, rewards points, credits, miles, or promises of future consideration of various types. A reward program or rewards program may include any reward, loyalty, incentive, points, miles or other program designed to reward consumers for undertaking actions, such as repeated purchases, undertaking requested activities, and the like, and may include, without limitation, credit card programs, virtual currency programs for digital media, airline points programs, cellular telephone programs, hotel and restaurant points programs, programs for merchants of food, and programs for any other kind of product. As used herein, AMEX, a trademark of the American Express Company, means AMERICAN EXPRESS, also a trademark of the American Express Company, or any other financial institution that handles credit card, debit card, or similar transactions, whether in real or virtual currency. A payment method may include any way for paying a price for a product or service, such as currency, money, specie, or reward program points, credits, miles or other incentive or unit. The terms "currency" and "payment method" may be used interchangeably. The terms "net value", "true cost", "net price" and "WisePrice" are used interchangeably.

A user may search for a product or service by signing in to a proprietary website and preparing a search request, as shown in FIG. 1. The user may search for any of a wide range of products. Typical requests may include searches for products from categories such as travel (e.g., a flight) or merchandise (e.g., a DVD). To facilitate a description of one aspect of the present disclosure, a hypothetical search for an airline flight is used. The search is accomplished with a system, such as the system depicted in FIG. 2.

System

An exemplary system, as shown in FIG. 2, may use any one, and/or a combination of these or other potential mechanisms, relationships, or approaches, or a combination of these, to execute the payment currency searches. Preferably, the system provides access to a listing, or database, of available flights that can be matched to the user's request. The results of these searches may attempt to determine availability of the product, per currency. To the extent possible, these searches may also collect published prices per payment method (e.g., $250 fare—a primary payment method). However, to complete availability and price determination, the use of a supplementary database, such as a Rules Database (Rules DB), may be desirable.

The system components in one embodiment, shown in FIG. 2, include a Web Server, Search Engine, Pricing Engine, Rules DataBase (Rules DB), and User DataBase (User DB). Each of these elements may be separate, or combined, either physically or logically. Additional elements may be included as desired. Additionally, particular application may involve the removal of certain elements. Exemplary components include a web server, a search engine, a pricing engine, a rules database and a user database.

The Web Server includes a server-hosted port receiving a data packet that includes a request to search for a product. The Search Engine, in response to the request from the Web Server, initiates a search to determine at least one of availability, prices, costs, values, and other potential product parameters. The search engine may be programmed to query many data sources for multiple, distinct types of payment currencies. The Pricing Engine, in conjunction with the results from the Search Engine, determines the actual or final availability, price, cost, value and/or other potential parameter of the products. The pricing engine may perform these calculations in part by using a set of rules (Rules DB). The rules database (rules DB) includes facts, knowledge, insight, algorithms, heuristics, etc. that enables, among other things, availability, price, cost, value and/or other parameter determination, per payment method. The user database (user DB) stores user-associated information including username, password, external account information, and/or potentially other data fields for each user.

Rules Database

The Rules Database, in one embodiment, includes facts, knowledge, insight, algorithms, heuristics, etc. Examples include available booking codes & definitions, mileage accrual rules, redemption rules, upgrade rules, payment method taxes & fees, discount types & rules, reward program intrinsic values, activity-specific redemption values, reward program exchange ratios, partner/alliance exchange rules, personalization analysis, etc. These facts enable, among other things, availability and price determination, per payment currency. In addition, other databases and sources may be connected to the system through the internet. These may include, as shown in FIG. 2, inventory originators, intermediaries and independent third party aggregators or providers. Also useful are access to the rewards programs of participating institutions and vendors, such as payment providers, promoters, discounters, account aggregators, and other intermediaries. A few examples of the Rules DB enabling availability and price determination follow.

A global distribution system (GDS), e.g., Amadeus, may show seat availability for a desired flight via the presence of certain booking codes. However, the GDS probably does not contain the prices of various payment methods for a seat on this flight. Using the booking code knowledge contained in The Rules Database, the price of each payment method can be determined. For example, the GDS may indicate that AMERICAN AIRLINES flight #10 has a seat available with booking code K, but no price will be listed for the "Use Miles/Points" payment currency. However, the Rules Database may state that the price for seats with booking code K on AMERICAN AIRLINES is, for example, 25,000 miles normal rate–5,000 miles discount+$100 co-pay+$25 baggage fees. This determination could be based on evaluating the booking code in concert with other parameters, such as the departure date, itinerary routing, eligible discounts, quantity of bags, and so forth, that inform the total price. Even if the price and other parameters are accessed directly from the airline, or travel provider, the published price is generally not indicative of the total price. Determination of that price may require consideration of additional criteria and personal decisions, such as the number of bags, purchase via agent or online, number of days prior to departure, coupon codes/promotions, and so forth.

The Rules Database also enables price calculations for derivative payment currencies. For example, prices for the "Transfer Miles/Points" payment currency are generally not listed by any source. The Rules Database contains rules that can be applied to "Use Miles/Points" prices in order to calculate the appropriate "Transfer Miles/Points" payment prices.

A single payment currency could be considered a primary and/or derivative payment currency, depending on the circumstances. For example, a price may have been collected for the "Use Miles/Points" payment currency for a particular airline. However, applying the Rules Database intelligence, it may be determined that via application of "Partner" or "Alliance" redemption rules, that the "Use Miles/Points" price is in fact cheaper for that same flight operated by the codeshare/partner airline. In this instance, the "Use Miles/Points" price for the partner airline is in essence a derivative payment currency.

Price prediction algorithms enable calculation of present and/or future prices. Collection of fare and award prices over historical periods combined with advanced analyses, e.g. linear regression, singular value decomposition, principle component analysis, enable price calculation for various scenarios. For example, assume the user entered a search for NYC to SFO for a date two months hence. Price prediction may be employed to determine the price for various payment methods for that specific itinerary. The system may use price prediction techniques to alert the user that other comparable or suitable itineraries have cheaper prices. The system may also inform the user to wait to purchase the preferred itinerary because the price is expected to decrease, or inform the user to now purchase the preferred itinerary because the price is expected to increase. The Rules Database may take on many different embodiments.

In one embodiment, the Rules database may include data from each participating vendor or merchant to allow for the particular rules or restrictions from the vendors. For example, a merchant may have different kinds of points or credits, such as supersaver miles or anytime miles. The merchant may require fewer supersaver or more anytime miles for a given trip, in which case the supersaver miles are clearly more valuable than the anytime miles. The relative value of the two may be clear simply from the given exchange premium, e.g., one type of miles may be worth twice as much as the other type. These different values may be used in calculation of net values or relative values. In addition, the miles may be appraised at different values depending on their use. For example, they may be given premium values for higher ticket items, such as upgrades to first class, upgrades to business class, for both domestic and international travel.

In a similar manner, valuations may be made for points contemplated to be transferred from the awarding vendor to a different vendor, if the rules of both allow transfers. The historical premiums awarded or discounts required may be placed into the rules databases and used, at least to predict what the value or cost of the contemplated good or service is. The rules may require minimum transfers and may allow only a certain number or maximum quantity of points to be transferred. In addition, transferees may add points or bonuses to the amount that users are requesting to transfer.

Points or credits from a rewards program participant may be valued in any number of ways by the participant. These valuations may be estimated by rules or programs stored in the rules database, or may be valued in other ways. User credits tracked in the user database may thus be kept track of or "valued" according to the rules of the rewards programs providers or participants. There may be different types of miles or points, and their quantity or value may depend on the status of the user, e.g., AMEX (MEMBERSHIP REWARDS) MR EXPRESS, MR and MR FIRST.

In order to calculate accurate results for users, extensive data analyses have been performed. A primary analysis that drives further analyses and calculations is that of determining the exchange or redemption value per reward program unit. The exchange value can be defined as the value that is received in return for using or redeeming that program unit. In general, the exchange value is stated in terms of a common monetary unit or currency, such as cents or dollars per point or points. For example, AMEX applies a standard 1 cent per point exchange value or ratio for several of its redemption categories. However, that value can vary widely based on the actual redemption (e.g., flight, hotel, car, merchandise, cash back, etc.) the user performs within a program and potentially even more so across programs. For AMEX, the system has examined all the possible redemption activities, the exchange values for those activities, the variances in exchange values based on any variables (e.g., price tiers, availability, redemption methods or mechanisms, redemption tiers, incremental value associated with any rewards earned during the redemption, discounts, etc.), and the frequency in which those redemption activities occur in order to calculate an average AMEX MR point exchange value. The same type of analysis is done across every program. Formulas or algorithms may be developed to calculate past or expected conversion values. Programs may also be indexed against each other. Furthermore, based upon a user's unique behavior and preferences, the relative weights, indices, and/or values are adjusted accordingly to calculate a unique exchange value per user.

Process Flow Chart

An exemplary process according to one aspect includes the steps shown in the Process Flow Chart in FIG. 3. Those skilled in the art will understand that the steps disclosed herein may be removed, rearranged, or combined as desired. Moreover, additional steps may be included according to a particular application.

One method of calculating a price, value or cost for a product or service is depicted in the flowchart of FIG. 3. In a first step 31 of this method, a user enters and a computer accepts a request for a search for product or service. The computer then searches 32 for availability of a product or service, and at least in one embodiment, the search is conducted with values returned in a primary currency, such as money. Examples are U.S. dollars, Canadian dollars, European Euros and British pounds. In a third step 33 of the method, the computer visits a plurality of websites or data sources and collects and stores prices that are posted or available in the primary currency. The computer then calculates 34 one or more of prices, costs and values in one or more secondary currencies. Secondary currencies may be any of the other currencies mentioned above, such as rewards program points, reward program/frequent flyer miles, rewards program credits, transfer or reward program points, and the like.

The next step 35 in the method is to determine availability of the product or service and a plurality of total prices, including a lowest price, for each currency which may be used to pay for the particular product or service. At this point, the computer program which is used in one embodiment of this method, also searches for and collects any price discounts, incentives, or considerations available for each product or service, and for each currency which may be used to pay for the product or service. The process than calculates the value of each discount, incentive or consideration, for each currency which may be used to pay for the product or service, and integrates 36 them into the price which has been calculated for each currency. An example is a coupon or coupon code that reduces the miles price by 5000 miles.

Once these incentives and other discounts have been collected and integrated or calculated, additional data may be used to personalize 37 the prices or costs per additional information about the particular buyer or user searching for the particular product or service. An example of such data is a further benefit the user may receive, such as frequent flyer miles, which are awarded for cash payments for airline flights, and are awarded for certain other payment methods, such as allied rewards programs flight redemptions, e.g. AMERICAN EXPRESS PAY W/POINTS. However, frequent flyer miles are not awarded for other payment methods, e.g., frequent flyer miles are not awarded to customers redeeming the airline's own frequent flyer miles. The amount of miles awarded to certain customers may be based on their previous history with particular vendors or sellers of the product or service. For example, certain airlines award 100% of frequent flyer miles to most customers, but will award 125% to more favored customers, 175% to yet more favored customers, and 200, 225, 250, and 275% to other classes of more favored customers. These distinctions may be made on the basis of the passenger's or customer's reward program status (e.g., silver, gold, platinum or diamond class), perhaps as a result of his or her historical purchases from this or another vendor. The incentive for a given purchase may also be based on the product or service for which a purchase is contemplated. For example, the incentive or discount may be greater for more costly purchases, e.g., whether a flight sought is economy class, premium economy class, business class or first class. The number of frequent flier miles awarded is an example of a highly variable incentive, based on these factors, wherein the award may influence the total cost or value to a passenger of a given flight, i.e., the particular service whose purchase is being contemplated.

The payments options presented to the user may include one or more of the options calculated as mentioned above. One factor in determining which options are presented may include user inputs on preferences. Thus, a user may have previously expressed his or her wishes to never, sometimes, or always to use or not use a particular payment method. For example, a customer may wish to use AMERICAN EXPRESS points only on product-type merchandise available from one source, rather than using such currency (AMERICAN EXPRESS points) to purchase airline tickets or resort lodging. A customer may enjoy flying only on one airline, or may wish always to fly on one airline so as to increase his or her status. Thus, the customer may wish to see flight options only from this airline. In one embodiment, these preferences may be input via a user survey, collected in a database, or expressed via real-time filters to then filter or determine 38 options which are presented to the user.

Taking these factors into account, the computer may then calculate payment options and identify 39 a single best payment option, e.g., a currency, or a series of payment options in a plurality of currencies, of which at least one currency is a rewards program currency. After presenting payment options, the computer may be programmed to facilitate or execute 40 a reservation or purchase transaction for the product or service. In one embodiment, the computer may also be programmed to collect and examine user data, e.g., purchase histories from a user or requester. The computer can search through posted prices for the goods or services purchased by the user, and can also search through incentives available for those goods or services, including similar goods and services not purchased by the user, but for which discount or incentive plans exist or existed. In one embodiment, the computer may then recommend 41 at least one rewards or incentives program which may be better for the particular user either in general or for a class of transactions or for just a single transaction. The program may be better in the sense of offering at least one of lower prices, lower costs, or higher values for the goods or services, or types of goods and services, purchased by the particular user.

Searching for a Product or Service

According to one aspect, as mentioned with respect to FIG. 1, the user enters a search request for an airline flight. There is considerable variation in the number of parameters that a user may be able to specify and that the user does specify. For an airline flight, for example, the user may simply enter an origin, a destination, and a departure date(s). For instance, the user may enter a request for a flight from New York City, N.Y. to San Francisco, Calif. departing on Mar. 17, 2010, a one-way trip. In other embodiments, the user may simply indicate a meta-destination, e.g., a category such as "beach", or "adventure." The system may also perform an origin-based search, e.g., simply enter the origin and see a map with best prices for all potential destinations. Examples of additional parameters that could be specified include return date(s), times, number of travelers, number of connections, class of service, etc. Furthermore, upon being presented with initial search results, as shown in FIGS. 6A-C, users are able to further navigate and adjust a detailed set of parameters that further filter and/or refine the initial results, as shown in FIG. 6D.

One embodiment of the search interface itself provides enhanced functionality relative to existing search options. For example, many airlines' award inventory search functionality is quite limited because it does not enable search of multiple parameters in a single query. These examples include: multiple days (e.g., +/−3 days of specified dates); multiple airports that serve the same city (e.g., having to enter three separate queries for "JFK", "EWR", and "LGA" instead of one query for "NYC"); multiple payment levels (e.g., separate query required for Saver and Standard Award); multiple service classes (e.g., separate queries required for Economy, Business, First); multiple service class variations (e.g., Business class outbound & Coach class return), etc. According the present disclosure, a search of a single reward program provides results that would require 10 or more searches via an existing reward program interface. Furthermore, users of the present disclosure may perform this search substantially instantly and simultaneously across multiple reward programs and multiple payment methods—a process that could otherwise require far more, e.g., one hundred or more separate searches.

Furthermore, existing search functionality is also affected by additional compromises, such as not identifying or making available all possible itineraries per a user's request. Aspects of the present disclosure improve upon at least these identified shortcomings to provide an easier and more powerful search. The present disclosure may enable these improvements via one or more of the following: an enhanced search interface that enables users to specify additional criteria; and an algorithm that smartly interprets user inputs to automatically execute additional relevant searches, inclusion of additional routing possibilities, and additional functionality and analyses. For example, if the user specifies "NYC" as the outbound or destination city, the disclosed system automatically performs searches for all 3 of the separate, major NYC airports (JFK, EWR, LGA) and presents the results to the user in a single search, i.e., a one-step or one click search. More technically, the computer system embodiments described herein are operable to execute a high number of simultaneous searches by executing parallel, asynchronous HTTP requests to multiple product availability sources (e.g., airline sites) and consolidating results as they arrive. The system disclosed herein is able to reach such high concurrency levels by using an event-based asynchronous design in lieu of system threads.

Upon submitting an initial search request, a non-signed-in, non-registered, or new user may be presented with a tour or a brief survey eliciting his or her redemption preferences & behaviors, such as those depicted in FIGS. 4 and 5. The survey may query the user as to his preferences with respect to redemption of rewards for an incentive program. For example, the survey may question the user whether he or she redeems rewards often, sometimes, rarely or never, for certain classes or goods or services. In one example, the survey may specifically query for these preferences in regards to airline flights, hotel or motel accommodations, car rentals or retail shopping. In another example, the survey may further question whether the user often, sometimes, rarely or never prefers a given level of a service, e.g., economy (a coach class flight or ticket), premium (a business class flight or ticket) or luxury (a first class flight). The survey could further question whether for premium or luxury service levels, does the user redeem directly for that level or via an upgrade. A survey may take on other forms, with a shorter format. For example, a user may simply be queried as to whether he or she prefers travel or merchandise rewards, or whether he or she prefers basic or premium travel accommodations. A survey may also take on longer forms, such as a survey that asks for specific kinds of goods or services preferred. Examples would be travel to specific countries or regions (Europe, Italy, England, Australia, and Thailand) or specific goods (wines, timepieces, and computers). Further, the Manage Module enables the user to further specify preferences within specific programs. For example, a user could specify that they only use their AMERICAN AADVANTAGE program for coach class flights, UNITED MILEAGEPLUS program for upgrades to business class, STARWOOD program for hotel redemptions of Category 5 hotels via the Cash & Points redemption method.

The results of the survey or other collection method can be used to interpret, analyze, and calculate user's personalized values for distinct reward programs and payment methods, which may in turn be used to calculate price parameters, comparable costs, relative values, and other analyses/measures. For a signed-in, registered or returning user whose redemption preferences have already been collected, the same survey is not necessary. Normally, a message such as "Searching service providers, reward programs, and payment methods for availability and prices" may be displayed while the user awaits the search results. However, additional or alternative graphics, forms, messages, surveys, notices, etc. may be presented as well. In one embodiment, if a user or searcher indicates in a survey that he or she never wishes to consider a particular category of goods or services, the system will not calculate options for those classes of goods or services. In another embodiment, the user may be presented, or periodically presented, with an option to venture into those classes of goods or services.

Calculating a Price

The initial, single search request by the user preferably initiates a plurality of searches to find availability of the product, via one or more payment currencies. For flights, for instance, seven payment currencies may be desirable. A user may pay cash or provide an official national currency, e.g., United States dollar-denominated specie, in exchange for the product. This may be possible via a number of mechanisms—provide cash, charge credit card, charge debit card, issue a check, send PAYPAL, etc. The user may redeem miles or points rewards program units accumulated in a reward program in exchange for the product. Examples include AMERICAN AIRLINES ADVANTAGE and STARWOOD PREFERRED GUEST. This form of payment is usually only applicable towards a limited set of flight inventory. This method could also include using cash to purchase "top-off" miles or points that may be required in order to meet the amount required to consummate the transaction. Additionally, this type of action could be part of another or part of multiple payment methods.

The user may transfer miles or points or other program units or credits from one reward program into another reward program in order to then redeem the transferred miles/points in exchange for the product. This method may provide access to both more product options and lower prices. For example, a transfer of 20K STARWOOD points could yield 25K BRITISH AIRWAYS miles. In another currency, a user may initiate a request through a reward program by which the reward program effectively executes a "Pay $" purchase transaction of the product with the desired merchant. In exchange the user's reward program points are debited at a corresponding rate/amount. For example, AMEX offers a "PAY WITH POINTS" feature in which the user's credit card is charged for the purchase of the product, and the AMEX reward program then credits this charge while debiting the user's reward program balance a corresponding number of points. This currency can differ from "Use Miles/Points" in that there are supposedly no inventory restrictions—points can effectively be used to purchase any available flight. However, in exchange for this flexibility, the user could be accepting a potentially comparatively lower exchange value for their miles/points. For example, AMEX's "PAY WITH POINTS" rules apply a 1 point per 1 cent exchange ratio.

In one embodiment, a relative value for the "pay with points" price is calculated in the following manner. The cash price or "pay $ price" is ascertained, as is the value of frequent flyer miles which are planned to be awarded to the prospective traveler. These two are added. The sum of all additional fees required is determined, and this sum is subtracted from the sum of the "pay $ price" and the value of the frequent flyer miles. This sum is then divided by the number or quantity of points required in the "pay with points" payment method or currency. This yields the transaction's point value. The transaction point value is then divided by the normal point value to determine the relative value for this payment method. A similar formula may be used for each of the other currencies or payment methods contemplated, with costs incurred or expected to be incurred subtracted, and with miles, or points, credits or other assets, awarded added to the value.

The same general method may be used in a calculation of a relative value for each of the other currencies or payment methods, such as paying cash, using miles or points, transferring miles or points, an upgrade payment, or using combined methods or combined currencies. For example, in calculating a relative value for an upgrade to first class from either business or coach, the following method may be used. The "pay cash for business" or "pay cash for first class" price is determined, and to this is added the value of the miles which are accrued based on actually purchasing the coach fare. Subtracted are the coach price or business class price which was paid, as well any upgrade or other fees required. The sum is then divided by the number of point, credits or miles required for the upgrade. This yields this upgrade transaction's unit value. The transaction unit value is then divided by the normal unit value to determine the relative value for this upgrade payment method transaction.

The value awarded to reward program points, miles or other credits may be evaluated in a number of ways. The actual awarded value is not determined until these points are used, of course. Nevertheless, an average value may be determined based on historical use of the points, either by the total population of users, by a subset of the population, or by the individual person in question at the moment of contemplating a purchase. In one embodiment, a particular value may be assigned to each redemption category, such as use of domestic coach, international coach, business class domestic, business class international, first class domestic, first class international, and domestic or international upgrades from each of coach or economy class to each of business class and first class, and so forth. The average value may be determined by assigning a cash value to each category and then multiplying each by the relative frequency or percentage of miles used in each class. This results in a composite value for the points so awarded. Other modifications or changes may be made based on changes in the programs or in perceived value received.

The user may also purchase an upgrade in at least two ways. In a first way, the user applies one or a combination of, dollars, miles, or other units, in exchange for a premium version of a product, for example, an upgrade from coach to a business class seat on a particular flight. Availability of this payment method may be quite restricted. However, when available, it may yield much lower prices/higher value than more traditional payment methods. Another way to purchase an upgrade involves a user applying upgrade certificates or coupons or vouchers in exchange for a premium version of a product, e.g., an upgrade from coach to a business class seat on a particular flight. Availability of this payment method may be quite restricted, and highly variable—and it can depend on seat availability close to the time of flight departure, the user's status with the associated airline's reward program, and other factors. These two methods of paying for an upgrade may be presented as merely one method in the charts and tables presented herein, but either or both methods are intended to be included.

The user may also utilize a combination of the previous six payment currencies, or other payment currencies that include a combination of payment methods, in exchange for the product. For example, DELTA AIR LINES' "PAY W/MILES" payment method enables purchase of flights effectively using a combination of "Pay $" and "Use Miles/Points". Similarly, AMERICAN AIRLINES' "ONE-WAY FLEX AWARDS" may enable purchase of a round-trip flight via "Use Miles/Points" for one leg and "Pay $," or another payment method, for the other leg. In an alternate embodiment, "Combine Methods" may require different payment methods per each leg of the flight. For example, an outbound payment method may require "Pay $," while an inbound payment method may require "Use Miles/Points". In such a scenario, DELTA's "PAY W/MILES" option may not be considered part of the "Combine Methods" payment method, because the outbound leg & return leg are effectively both paid for via the same payment method. The payment methods identified above are exemplary embodiments, and are not intended to limit the present disclosure. The identified payment methods correspond to a framework that combines 1) the currency unit, and 2) the transfer relationships.

Another exemplary embodiment for payment methods corresponding to the same framework that combines 1) the currency unit, and 2) the transfer relationships may include, but are not limited to currencies of cash, miles, points, transfer of rewards program currency, upgrades and combined currencies.

In another exemplary embodiment, payment methods using solely the currency unit framework may include, but are not limited to, cash, miles, points, credits, certificates for a merchant's products, and a combination.

Another exemplary embodiment for payment methods using solely the currency unit framework may include, but are not limited to cash, rewards currency and combine cash and reward program currency.

Another exemplary embodiment for payment currencies using solely the transfer relationship framework may include, but are not limited to the following: i) Buy: Transfer currency from non-reward program to merchant for a merchant's product; ii) Redeem: Debit currency in merchant's reward program for same merchant's product; iii) Transfer: Transfer currency from one reward program into another merchant's reward program for that merchant's product; iv) x-Purchase: Debit a user's currency in one reward program while sending money to another merchant (not reward program) for that merchant's product; v) Upgrade: Execute sequentially-dependent currency transactions for a merchant's product; and vi) Combine: Combine any of above payment currencies in exchange for a merchant's product.

Clearly, different frameworks are possible to describe payment currencies/methods. Thus, the number, definition, terms, and/or name of payment methods, among other attributes, may be varied as desired. Further, the present disclosure includes any type of payment currencies in which two representations of value are exchanged. Further, payment methods as discussed herein may be aggregated, reduced, altered, or otherwise modified.

Searching for Information About Products and Services

The exemplary search for product availability and collection of published prices for a flight or other good or service may be executed in several ways including, but not limited to access via these methods: i) Screen Scraping; ii) Airline Reservation System (ARS)/Direct Feed from travel provider; iii) Global Distribution System (GDS); iv) Alternative Content Access Platforms (ACAP); v) Host Agency, and vi) a Travel Agency.

At this point after collection of prices, in one embodiment, a relative lowest total price is established for each payment currency. However, these prices may be reduced by potential discounts. A net price is the offered price less one more discounts or reductions. Additional eligible discounts may optionally be applied to each of the payment currencies in order to determine the lowest total price per payment method. These discounts may apply to any user or may be personalized—only applicable for certain individuals and/or persons meeting specified criteria. Further, there are many potential sources for discounts: airlines/travel providers, credit cards, reward programs, deal aggregators, etc. Specific efforts are preferably made to apply the most optimal discounts (e.g., magnitude, relevance, etc.) from the most optimal sources (e.g., reliability, frequency, etc.), if not all of them. Integration of discounts establishes the final lowest total price per payment method. In one embodiment, and with reference to the Process Flow Chart of FIG. 3, discounts may be applied in only one, multiple, separate and/or combined steps. In this embodiment Steps 35 and Step 36 may remain separate and both steps may involve application of a discount; or Step 35 and Step 36 could remain separate with only Step 36 involving application of a discount; or Step 35 and Step 36 could be combined into a single step which would apply all potential discounts.

However, in order to effectively compare prices across payment currencies, it is desirable for the prices to also be converted into/expressed as/made available as an equivalent price or "comparable cost". For example, it is neither obvious nor simple for a user to determine whether paying $250, redeeming 25,000 AA miles, or using 25,000 STARWOOD points is a lower price/better value. Thus, it is desirable for a comparable cost to be calculated per payment method, as shown in FIGS. 6A, 6B, 6C, 6D, 7A, 7B, 7C, 8, 9, and 18-28. The comparable cost for a payment method, according to one aspect, is analogous to calculating a user's opportunity cost to use that payment method. The comparable cost preferably equals the difference of what the user provides as payment for the product and any benefits the user receives (e.g., rewards/miles received for both 1) purchasing a flight and 2) travelling on the flight). As benefits can also accrue based on a user's reward program status (e.g., 1K status with UNITED AIR- LINES MILEAGEPLUS) and class of service bonus (e.g., purchase of a first-class flight), the user's status and class of service may be incorporated into the calculation. Other relevant factors such as program balance, rewards accrual rate, rewards acquisition cost, and "planning" or "goal-setting" [includes desires and expectations such as the desire for program status (e.g., user wants to maintain or improve status), or expectation of future trips (e.g., an international vacation] are also preferably incorporated into the comparable cost calculation. For example, in one embodiment, the system may recommend not using one reward program because the user has entered an expectation or a desire for a future trip to a particular destination. Therefore, the system notes the expectation and recommends saving miles from the most appropriate rewards program for the planned trip.

In one way to calculate prices and present the results, FIG. 6A depicts a flight view for each of two flights from New York City JFK to San Francisco SFO. The default search parameters are depicted by the checked boxes on the left of the figure, specifying certain airline programs in which the user may be a member and for which he or she possesses rewards or "currency", five "currencies" or payment methods, coach, business class and first class flights, and nonstop flights, one-stop flights, and flights with two or more stops. The flight view depiction of the results of the search indicates a plurality of ways to pay for the flight.

Each flight which was discovered by this search is available for purchase in four currencies, including $140 in cash, use of 12,500 AMERICAN AIRLINES ADVANTAGE miles, a transfer of 12,500 STARWOOD points, or for paying with 14,669 AMERICAN EXPRESS points. Since at least the first two results presented in FIG. 6A are coach flights, no "upgrade" method of payment may be used. The search also did not disclose a way to pay for the flight using combined currencies or methods. The presentation indicates that the AMERICAN EXPRESS points for the 10:35AM flight is the best overall for all the flights. A payment option identified as such typically has the best or lowest true cost for this particular flight as well as for all the flights found in the search. This presentation also indicates that for the 7:05 AM flight, paying with 14,669 AMERICAN EXPRESS points is the best deal or WisePrice for that particular flight, and the true cost is also $91. In this embodiment other elements of the flight have pushed the 10:35AM flight to be scored as the best overall flight. For example, the 10:35 flight may have shorter flight duration, or the user may have asked for a flight from 10 am to noon. Additional flights from this search are also presented in FIGS. 6B-6C, each with a "best in flight" or true cost selection. These screens show only the prices of the various payment options, and each also shows a "true cost" calculated for each flight option.

WisePrice Scoring Function

The system may use a scoring function to determine the best result or payment method or payment option. In one embodiment, a best score is a function of just the WisePrice. In such a scheme, the rating is calculated as follows: WisePrice score=max (1, 100−(WisePrice−WisePrice_min)/10), where WisePrice equals the WisePrice of the payment option that is currently being scored and wherein WisePrice_min equals the lowest Wiseprice of all payment options for the particular product or service being considered. The max(1, . . . ) function ensures that the minimum score is 1. Dividing by 10 enables increasing the range of WisePrices shown from 100 to 1000. Some examples of how a range of WisePrices convert to scores are shown in Table I.

TABLE I

| WisePrice | converts to | Score |
|---|---|---|
| $0-$1000 | ==> | 100-1 |
| $100-$1100 | ==> | 100-1 |
| $200-$500 | ==> | 100-70 |
| $200-$1000 | ==> | 100-20 |
| $200-$1200 | ==> | 100-1 |
| $200-$2000 | ==> | 100-1 |

Importantly, in this embodiment, regardless of the range of WisePrices, a difference in score of 1 point (for scores higher than 1) is exactly equivalent to a $10 difference in WisePrice. Other embodiments may use other algorithms. Preferably, a scoring function is used to calculate a single value to capture the collective importance of several functions or variables. Examples of such variables include "WisePrice", "relative value", "earned rewards", and "improve status." This rule and all other rules and calculations disclosed herein may be part of the Rules Database.

Note that in FIG. 6D, the user has unchecked the "coach" option, and is now seeking a flight in business or first class. The payment options now include the previous currencies discussed, along with another option, an upgrade, which may be purchased with 15,000 AA miles and the $140 cash price of the corresponding coach seat on that flight. Besides showing the price for each flight option, FIG. 6D also shows a true cost or lowest comparable cost for each flight and a "best overall" true cost for the 3:15 pm flight, as the best deal for the traveler.

Figure 7B:
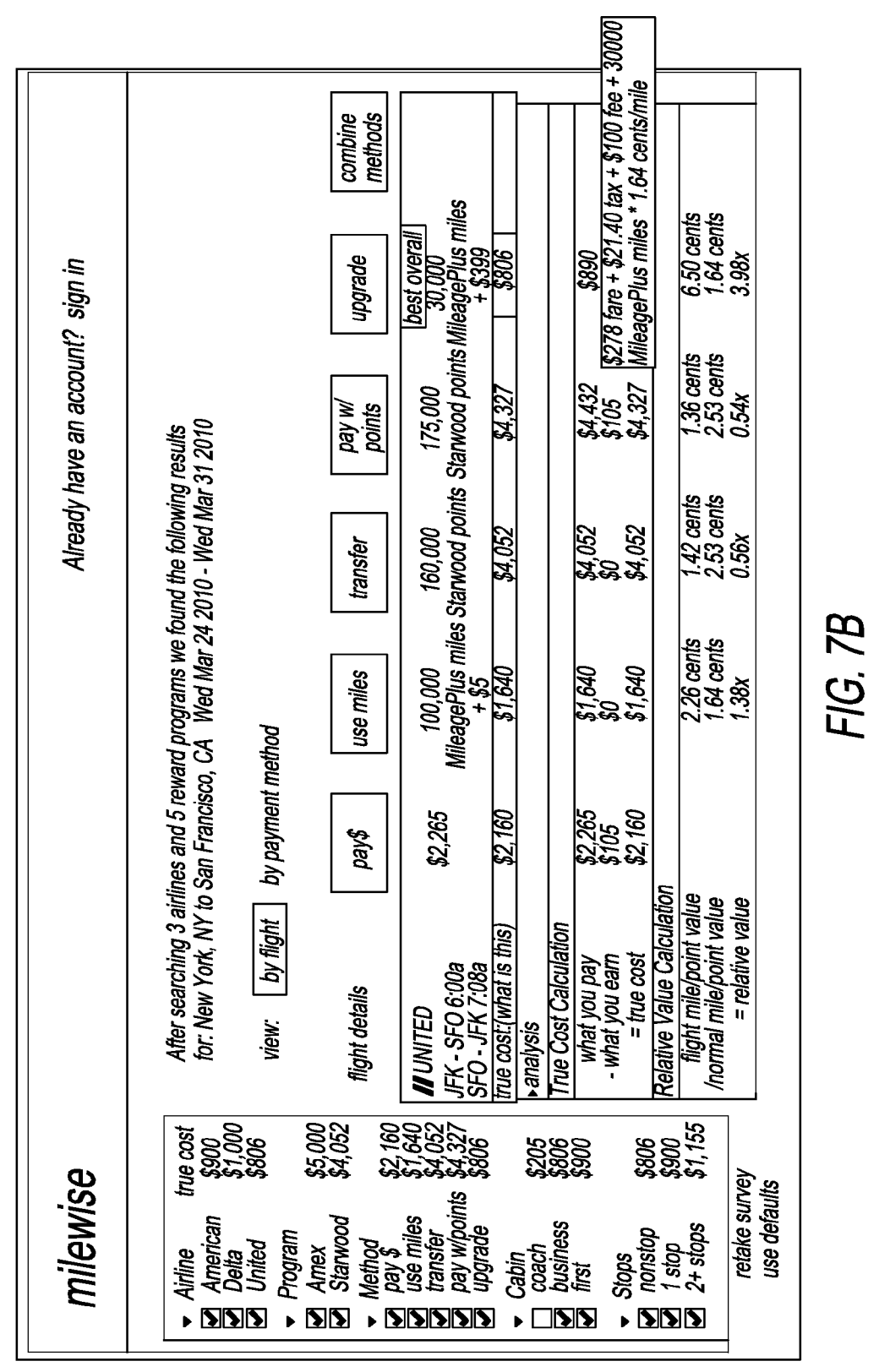

As discussed elsewhere, the "true cost" depicted in the figures represents the comparable cost after known incentives are added, or the dollar equivalent of the price, including the value of rewards earned. A true cost or net price is the offered price less one or more discounts or reductions. In this case, the true cost may reflect the effect of frequent flyer miles expected to be received by the user for making the purchase and taking the flight. FIG. 7A refers back to FIG. 6A, for coach flights, while FIGS. 7B and 7C refer to non-coach searches. Thus, in FIGS. 7A-7C, the prospective passenger may receive miles if he or she pays cash or pays with AMERICAN EXPRESS points. The rules database expects that the passenger will not, however, receiver frequent flyer miles if he or she uses AA miles or transfers STARWOOD points. FIGS. 7A-7C also indicate the relative values of the other non-cash currencies. Based on calculations explained elsewhere herein, the user receives a value of 1.12 cents per AA mile, versus a normal or expected value of 1.55 cents per mile. This represents a penalty (unfavorable to the user) of 28%, and thus the value which would be received for using AA miles has a relative value of only 0.72 or 0.72× a normal value. In other embodiments, there may be different types of frequent flyer miles or other incentive, such as premium or supersaver miles, standard or anytime miles, premium points and standard points. These miles or points may be accorded different values by the vendor or merchant, and may be transferred or exchanged for different values. When net values or relative values are calculated using these different miles or points, or in general for any miles or points or reward units, an average or blended composite of the exchange values may be used. In one embodiment, such an average value may be based on the relative quantities of the points, or on the perceived values or preferences of the user for the points or miles. In another embodiment, such an average value may be based on the relative frequency of different pricing tiers, or instances in which more or less reward units are required per the "same" redemption.

In the same manner, if it costs the user 12,500 transferred STARWOOD points, the user is still receiving a value of 1.12 cents per STARWOOD point. However, in the past, either this user or users generally received a value of 2.33 cents per STARWOOD point. Thus, using the STARWOOD points for this purchase represents a discount (unfavorable to the user) of 1.12/2.33 or 52%, and is receiving only 48% of the normal value of his or her STARWOOD points. Thus, the relative value of the STARWOOD points in this transaction is only 0.48× their normal value. For the AMERICAN EXPRESS points however, the user is receiving a value of 1.27 cents per point, which by itself is greater than the 1.12 cents per AA mile or STARWOOD point. In addition, however, AMEX points, either for this user or generally, typically have a value of only 0.89 cents per point. Thus, the prospective passenger is receiving a premium (favorable to the user) of 1.27/0.89 or 43%, and is receiving 143% of the value he or she normally receives for AMEX points. Thus, paying for the flight in AMEX points "currency" with a 43% is the best overall value found in this search. In various embodiments, the best overall value could be based on both the true cost and the relative value measure or just one measure or an entirely different measure or measures.

The remainder of the flights in FIGS. 7B and 7C depict calculation for other flights and the true costs and relative value of the alternative currencies, including the cost/price/value of an upgrade. In FIG. 7B, if a searcher desired a business class or first class flight, the user may pay the cash price of $2265, may use 100,000 MILEAGEPLUS miles and pay $5, may transfer 160,000 STARWOOD points, or may pay directly with 175,000 STARWOOD points. Alternatively, the user may seek an upgrade, paying a $399 coach fare and upgrading with 30,000 MILEAGEPLUS miles. The search program indicates that the Upgrade is the best value, or has the lowest cost. The lowest cost is seen in the "true cost" row as $806, compared with the true cost of the alternative methods of payment. The true cost "hover text" shows cost details for the $806 true cost using a $278 cash fare, $21.40 tax, $100 airline fee, and 30,000 miles valued at $399.40. Further details in the relative value calculation suggest that the upgrade provides the best value in this case because the user is receiving a much higher value, 6.50 cents MILEAGEPLUS mile, than the normal value he or she normally receives, 1.64 cents. The same sort of calculation is also seen in FIG. 7C, and here the hover text shows the relative value calculation for the 6.5 cents/mile value of the user's 30,000 MILEAGEPLUS miles. In this case, the relative value of this transaction equals the $2265 cash price, plus $84 in miles earned for flying, less the $399 upgrade charges, divided by the 30,000 miles "price," or (($2265+$84)−($299 fare+$100 fee))/ 30,000=$1950/30,000 miles=6.50 cents per mile.

The hover text views are explained in FIGS. 24-25. In a first example, FIG. 24 explains that a true cost is determined by converting all currencies to a common currency, such as cash. True cost is the total of the price paid or the value of payments by the buyer minus incentives received. Relative value is a measure to determine the value received in a transaction by the user, compared with what the user normally receives or expects to receive. Key to relative value calculations is the valuation of the other currencies—what is the value to the user of points, credits or miles, in a common currency. This valuation may be defined by the user or based on a calculation. The value of the other currencies may be a single value, if only one is used in a transaction, or may be a blended or weighted value, if more than one is used in a transaction.

In a second example, FIG. 25 explains the contents of a hover text panel that may appear when the user holds a screen cursor over the indicated payment currency. Thus, if a user hovers over the "pay w/points" price, the hover text in one embodiment will show the fare, tax and fees, minus any fees for using "pay with points" as representing the cash value that points are being redeemed for in this transaction. This is also one way that the user or the computer can calculate the relative value of points to cash. If the user hovers over the "use miles" price area, the hover text panel will disclose the "Pay $ price of fare and tax and fees, less any fees for using the "use miles." This represents the cash value for which miles are being redeemed in this transaction. FIG. 25 discloses other details revealed when the user hovers over other prices in this method. When the user consummates a transaction, the redeemed value of the points may be stored and used in future calculations.

Figure 9:
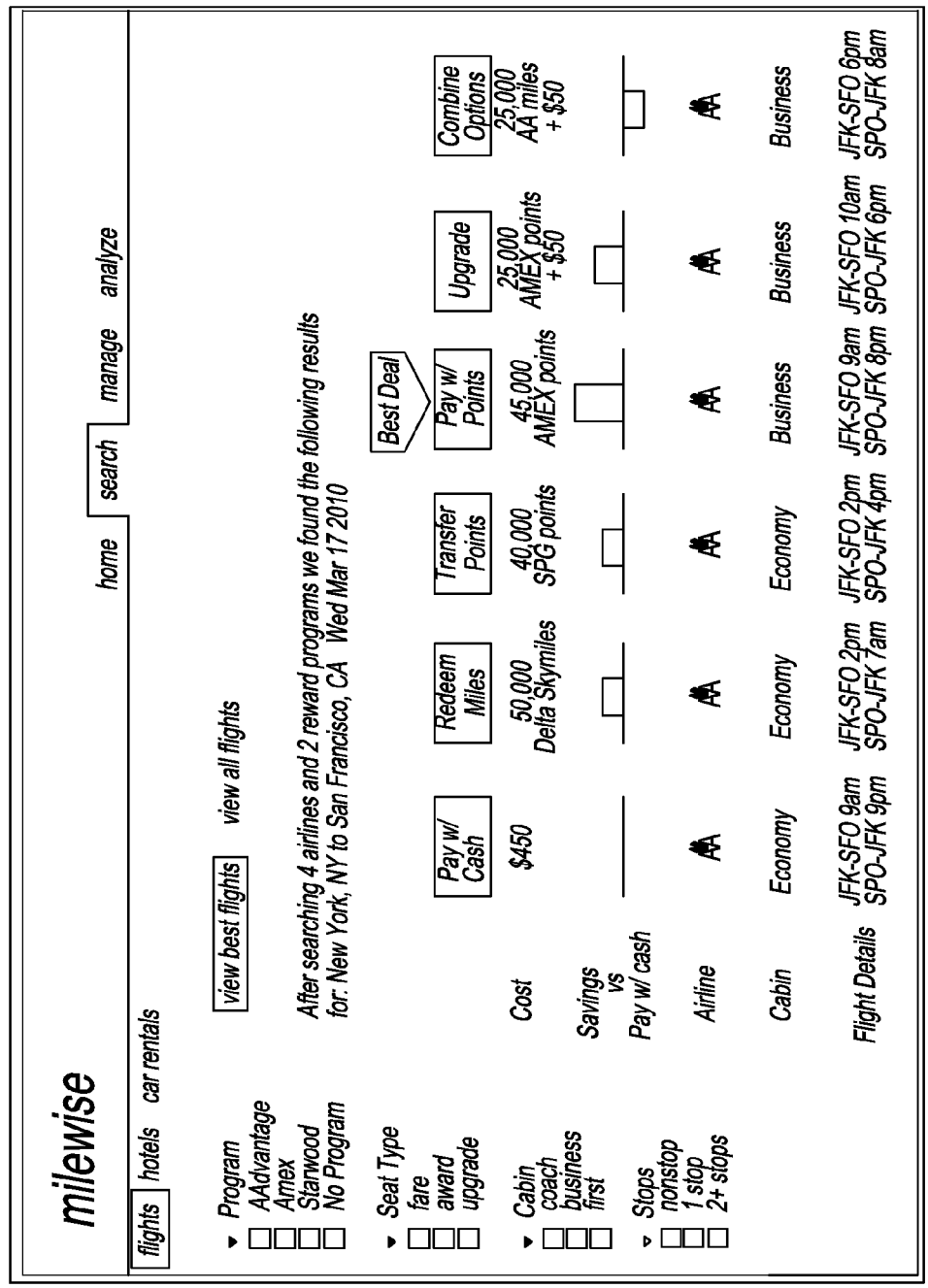
FIG. 9 is an example of one embodiment of the Search Results Page—Payment View B.

FIGS. 6A-6D and 7A-7C are all presentations with flight views, that is, a flight is presented with several different payment methods or currencies for each flight. FIGS. 8-9 present the information in a different way, a payment view, which presents the least expensive flight for each currency payment. Thus, in FIG. 8, the top row is the least expensive option for paying with points, 45,000 AMEX points, equivalent to $250 in AMEX points and a relative savings of $200 compared with the cash price of $450 (row 5, $ payment). Other payment options in each row present the "currency" requirement as well as the cash equivalent, and another column presents the savings from using the alternate currency vs. paying cash. These additional rows include: a combined option of 25,000 AA miles and a cash payment of $50, equivalent to a $300 cash payment; a payment that calls for transferring 40,000 SPG points, equivalent to a cash payment of $350; using 15,000 United mile and paying $250 cash, equivalent to paying $400 cash; the aforementioned $450 cash payment; and redeeming 50,000 DELTA SKY MILES, which is equivalent to a cash payment of $500. The "Deal?" column includes symbols to let the user know whether using the currency provides value ("a deal", symbolized with a check mark √), may be questionable if there is no increased value, or "X" if the deal is unfavorable to the user. In this case, the first three flights provide increased value to the user, the fourth flight provides marginal value, and the last two provide no value or are unfavorable. Note that the presentation also highlights the "best" or cheapest flight in two ways: the cost in $ is highlighted, and the option is presented first on the page. The remaining options are ranked from best to least value for the user and the "cost in $" for each currency provides the ranking.

In FIG. 9, another payment view, the screen depicts the best value for 6 "currencies": cash, redeemed miles, transferred points, pay with points, an upgrade and a combined option. In this screen, the first four options after cash depict a savings vs. a cash payment, while the last option, a combined option, depicts an unfavorable deal, a loss vs. a cash payment. The particular flight for each option is listed at the bottom of the chart. In this chart, the "pay with points" option has the highest savings vs. a cash payment, in the same manner as shown in FIG. 8., and so is marked as the "best deal".

According to one way to calculate the comparable cost—dollars, miles, points and other potential payment method currency units may be converted into a common unit/equivalent currency. One aspect of the present disclosure uses "US$" as the common unit, although another unit could be used as well. Alternately, a comparative unit may be created. For example, the comparable cost could be presented as a "score", perhaps as a numerical value (e.g., 250, 8), or presented as a "recommendation" (e.g., "good deal", thumbs up icon, smiley-face icon), or in some other manner. The intent is simply to develop an index/score that enables a quick comparison and ranking Thus, an exchange value is assigned to each reward program unit (e.g., an AMERICAN AIRLINES ADVANTAGE mile, a UNITED AIRLINES MILEAGE-PLUS mile, a STARWOOD STARPOINT). The exchange value may be calculated based on a number of on-going analyses that vary in complexity. At least three instances of the exchange value may be included: 1) "default", 2) "personalized", and 3) "user-specified". The "default" exchange value may be calculated based on an average user's redemption behavior. The "personalized" exchange value may be calculated for a particular user based on that particular user's purchase and redemption behavior & preferences.

The surveys of FIGS. 4-5 represent exemplary embodiments of a form to quickly collect a user's purchase and redemption behavior & preferences. The Manage module, described below, also enables more granular collection and analysis of users' purchase and redemption behavior & preferences]. The "user-specified" exchange value includes an exchange value that a user can explicitly state/input into a computer. Utilizing the "personalized" or "user-specified" exchange values further personalizes, or makes unique, the comparable cost calculation per each individual user. Based upon ongoing data collection and analysis regarding the user's preferences & behavior, fluctuations in real-time payment method prices, reward program economics & policies, and other criteria, exchange values may be calculated and modified as needed, and used in calculating the comparable cost. Over time, data collection and analyses are expected to provide convergence on true exchange values per each individual. Moreover, each payment method may require a unique formula to calculate the comparable cost, as will be understood by those skilled in the art.

Several comparable costs may be calculated. In addition to a version that approximates a user's opportunity cost to use a payment method, as described above, another version approximates a user's acquisition cost to use a payment method. The latter version preferably approximates the unique cost to each user to acquire the amount of "currency" required for the payment. For example, assume the price for a flight using the "Pay w/Points" payment method is 50,000 points. Assume the user has acquired 50,000 points over a 2-year period. Further assume the user has made 2 annual-fee payments for the associated credit card of $50 per year. In one embodiment of the formula, the acquisition cost, or comparable cost, for that 50,000 points price is $100. In another embodiment, the formula could be modified to include the impact of sign-up bonus points, bonus points accrued for specific transactions, actual dollar transaction charges required to accrue the points, and so forth.

While the comparable costs enable comparison across payment methods, users may also seek to understand, for each payment method, how the current transaction price compares to "normal/average/similar" transaction prices. Hence, calculation of a relative value, and/or other value measures, enables comparison within a payment method by identifying how much or how little value a potential transaction provides relative to "normal." More specifically, the relative value compares a transaction's $, miles, points or price in another currency to that payment method's "normal" price, e.g., US$, AA miles, STARWOOD points or price in another currency, as shown in FIGS. 7A, 7B, 7C and 18-28.

For example, if the product search displays a result for a flight with a "Pay $" method price of $80, and normally the price would be $100, then purchasing that flight using the "Pay $" method would provide a relative value equal to 120% or 1.2×(1+$20/$100) the normal value. Analogously, if for the "Use Miles/Points" method, the transaction is providing 0.5 cents mile value and the normal mile value is 1.5 cents, then purchasing that flight using the "Use Miles/Points" method would provide a relative value equal to 33% or 0.33 (0.5 cents/1.5 cents) of the normal value. In this example, the relative value calculation converts miles and/or points into a corresponding $ value to effect the comparison; however, other conversions, or embodiments, could be used to determine the relative value. Additionally, the normal value may be calibrated/calculated in many ways. In one embodiment, a historical average across an entire population of flights may be used. In another embodiment, a user's personal behavior could be analyzed to determine a personalized normal value per payment method. In another embodiment, a user could specify a normal value per payment method. In another embodiment, a user could specify a minimum or floor value per payment method. Utilizing a normal value based on the user's personal behavior or specification, further personalizes, or makes unique, the relative value calculation per each individual user. Each payment method may require a unique formula to calculate the relative value, or value measures, as will be understood by those skilled in the art.

At this point, availability, prices, comparable costs, and relative values measures per payment method have now been determined and can be presented/displayed/made available to the user, as shown in FIGS. 6A, 6B, 6C, 6D, 7A, 7B, 7C, 8, and 9. The display to the user of the analytical measures can be presented in many ways. Pop-up screens, drop-down screens, expansion panes, and so forth, may be presented for each payment currency or across all payment currencies. Visualization of this information in a single view across all payment currencies enables simultaneous and comprehensive analysis of multiple payment methods for a single flight. Additionally, the user can elect or may have previously elected to only view certain payment methods, or payments to certain providers. For example, the user may have elected to not view any prices that involve the STARWOOD rewards program. Or, the user may have elected to only view payment methods and/or payments to providers for which the user would be able to consummate a payment with their existing program balance. For example, if the user does not have enough miles or points in his or her AMEX MR account balance to purchase the current search results/flights, the user may not want to view any AMEX MR prices, even if those prices are the lowest prices. Hence, a user's reward program account balance could influence the payment methods and/or providers that are displayed. Many variations of display preferences/filters may be specified. Upon considering all relevant criteria, then the applicable payment methods, associated prices, associated comparable costs, associated relative values and other parameters may be presented, displayed, or made available to the user or requester. The nature of the presentation could vary considerably. There may be several different views (e.g., basic, advanced, expert, by flight, by payment) and user-flows that the user may select from. In different embodiments, the presentation may display the information in different ways.

In one embodiment, the presentation may include identification of the "best" payment method. In one embodiment, the best payment method may be identified as the one with the lowest comparable cost, as shown in FIGS. 6A, 6B, 6C, 6D, 7A, 7B, 7C, 8 and 9. In other instances, a relative value or a value measure may be used to identify the best payment method. Other examples of a value measure to identify the best payment method are "Earn" and "Earn ROI". Earn is a measure of the absolute number and/or absolute value of rewards earned per result payment method. Earn ROI is a measure of the relative value of the rewards earned. In one embodiment of the Earn ROI formula, the calculation is a simple ratio of the spending required to the rewards earned. Additionally, other criteria may determine an alternative payment method as "best". For example, if the user wants to maintain elite status in a specified reward program, and that criteria is not already included in the comparable cost and/or is further emphasized as a decision criteria, a payment method that facilitates that desire, even though it may not be lowest price, may be identified as the "best" payment method. Incorporating user desires and calibrating trade-offs to identify the best payment method may be an on-going, evolving analysis.

The parameters that determine best payment method may influence and/or determine how search results are displayed in the interface. For example, if for a particular user, comparable cost is the key decision criteria, then the results will be ordered by comparable cost—flights with the lowest comparable cost will be listed first. More specifically, in the "by flight" view of FIGS. 6A, 6B, 6C, 6D, 7A, 7B and 7C, flights may be ordered such that for the first flight displayed, one of the payment methods for that flight has the lowest overall comparable cost among all flights that meet the user's search criteria. Subsequent flights displayed may be ordered such that one of the payment methods for those flights is considered to have the $2^{nd}$, $3^{rd}$, and so on comparable cost among all flights that meet the user's search criteria. Thus, in addition to identifying an overall best payment method, localized, or per flight, "best" payment methods may also be identified. If two flights matching the user's search criteria have an equal, lowest comparable cost value, the "rank & display" algorithm compares the payment methods with the next lowest comparable cost value for each of those flights and displays first the flight with the lower value. If, however, there is still a tie, then the process continues comparing the next lowest comparable cost values for those two flights. If this process continues without resolution, then other criteria are considered to rank and display those flights. Such criteria include number of stops, departure time, departure flight duration, return time, return flight duration, etc. Likewise, assuming comparable cost as the key decision criteria for best payment method, then in the "by payment" view of FIGS. 8 and 9, each payment method may be listed along with the particular flight that has the lowest comparable cost for that particular payment method, among all flights that meet the user's search criteria. The exemplary method described herein to rank and display flights may be further modified and may assume other forms in other embodiments.

Integral to the analysis described thus far is processing performed or information collected via a reward program management module, as shown in FIGS. 10-17. One advantage of this module is to enable users to gather in one location via an enhanced interface, for all of their reward programs, any of the data and functions they are operable to perform within each of their reward program's proprietary interfaces. Examples of these functions may include: view program balances (e.g., year-to-date, program-to-date, elite qualifying miles/points, redeemable miles/points), view & search program activity/transactions, and view program status (e.g., Silver, Gold, Platinum, Diamond). The management module may also enable functionality not provided by existing reward program interfaces, such as: view activity required to maintain program status, view activity required to improve program status, view minimum activity required to prevent rewards expiration, establish & receive expiration alerts, establish & receive balance alerts, and establish & receive travel availability alerts (e.g., availability of award seat inventory for preferred destinations). In addition, embodiments may also evaluate and present an estimated value of the user's reward programs balances. One way to calculate the value is in $ based on corresponding exchange values per the distinct reward program currencies or units, but different or additional units or analyses may be used or performed.

Thus, part of a user's computer-based rewards program management module may include the basic interface or "dashboard" shown in FIG. 10A, which lists the user's rewards programs, along with data such as the type of merchant or vendor, the user's status if any for each program, a balance of points, miles, credits or other currency, if there is a balance, for each program. In this embodiment, the system has calculated that the user's miles have a cash value of 1.5¢ per mile and has calculated a value of accumulated airline miles in one program. The final column, actions, enables the user to view details or go to the program's web site. The header of the dashboard gives summary cash value of all the user's account balances and another header on the left gives a quick summary of the equivalent cash value in each of the accounts.

FIG. 10B provides another embodiment of a user's basic dashboard. In this simpler embodiment, the dashboard discloses the program name, the account balance, the user's status if any in the programs and the calculated cash value of the user's balances. The dashboard also has a column for indicating the category of merchant or vendor, e.g., airline, credit card, and so forth.

A more sophisticated or advanced management module is depicted in FIG. 11. This module is similar to the one depicted in FIG. 10 with additional columns. More details are provided, such as the miles or purchases needed to retain a particular status, e.g., "gold" status in AMERICAN AIRLINES frequent flyer program. Another column lists the purchase needed to improve the user's status in the same program. In addition, helpful information on the likelihood or risk of expiration of the user's points is added. Other information may also be added if the user wishes to customize the module.

FIG. 12 depicts another embodiment of a dashboard. This screen is for a single reward program, vendor, or merchant, in this case AMERICAN AIRLINES. The user may use this view for a very detailed look at the account, including viewing recent purchases/transactions/redemptions. In one embodiment, the dashboards are maintained as computerized records. The computer may scan vendor accounts periodically to update the user's information and/or update the account upon user request. As additional purchases are credited, or uses or transfers debited from the account, an accurate balance is maintained for the account. FIGS. 13A-13B depict screens with which the user enters information to set up a dashboard account in the computer system. FIGS. 14-17 depict additional screens for viewing and updating account information for the user.

A user's reward program information may initially be collected when a user selects to add/connect/link/track a program and then enters their corresponding account number and password. This information may be collected by performing a screen-scraping, but could be enabled by other methods, including direct access, or a third party (in which case, account number and password credentials may not be required). Substantially similar methods may be used to continually and in real-time update the user's information. As the management module may access, aggregate, analyze, and present all of the user's reward program information in a simplified, centralized view, it can facilitate on-going, incremental analyses while also being a core element of certain analyses—such as identification of best payment method.

Calculations of Payment Methods and Associated Cost and Value Analysis

Different currencies for payments were discussed above. One series of payment calculations is now discussed in detail with respect to FIGS. 18-23. In one embodiment, users may be presented with six currency options for payment. These options include cash, use miles or points, transfer miles or points, pay with points, upgrade and a combined method. Each of these is discussed in turn. In FIG. 18, the pay with cash option is shown. In one computerized method, a true cost is calculated, detailing the price for each portion of the prospective transaction, such as the fare, tax, the booking fee, and other details, for each leg of a trip. The details are further broken down into payment by the passenger and benefits, incentives or discounts received, e.g., frequent flyer miles. The frequent flyer miles are valued here at about 1 cent per mile, per the discussion above. The true cost is then calculated as the value given by the passenger less the value received, in this case—the value of the frequent flyer miles. Thus, while the cash price of the given trip is $210, in this example, the user receives back frequent flyer miles worth $55. Thus, the true cost of the trip for this cash purchase is the difference, $155. A relative value may also be calculated. In one embodiment, historical analysis of cash prices in the context of the current economic environment would enable determination of whether the current price is a good value, and potentially even whether it's expected to increase or decrease.

A cost and value calculation method for "use points/miles" currency transaction is disclosed in FIG. 19. In this analysis, a user's incentive points or miles are valued at about 0.8 cents per mile. Thus, the user pays 20,000 airline miles, valued at $160, in addition to cash payments of $160. The total value given by the passenger is thus $320. In this transaction, the airline awards no points or frequent flyer miles, since the user is redeeming his or her miles. The calculation of relative value may also be shown. FIG. 20 discloses the details for a "transfer points/miles transaction." The valuation of this transaction is similar to that of FIG. 19, in that the user pays with points for the flight, but must also pay a redemption fee, a transfer fee for transferring the points, as well as co-pays, an expedite fee and a booking fee. Thus, the price of the transaction is 20,000 points, and $210 cash. If the points are valued at 0.8 cents per mile, the true cost is $370. A relative value may also be calculated. Note that no incentive or discount is received in this embodiment for the use point/miles or transfer points/miles methods.

In another embodiment, the pay with points payment method allows a user to redeem points and yet receive an incentive, in the form of frequent flyer miles. In this example, the user's airline miles are valued at 0.8 cents per mile, thus yielding a cost to the user of $160 when he or she pays with 20,000 points. Additional fees of $100 are also required, for a total input of $260. In return, however, the passenger receives 5500 frequent flyer miles valued at $55. Thus, the true cost of this flight, paying in this manner, is $205. FIG. 22 depicts a calculation when the passenger opts to purchase an upgrade. Note that in order to purchase an upgrade, the passenger is first required to pay a basic fare. In this example, the passenger opts to pay $160 for the basic fare, as well as other cash payments of $150 for the tax, co-pay, expedite fee and booking fee. He or she then upgrades, using 20,000 frequent flyer miles, valued at $160. The total passenger input is thus $470 ($160+$150+$160). In return, the passenger receives $55 in frequent flyer miles—corresponding to the purchase of the coach seat. The true cost of the flight is thus $415.

An example of a combine payment method is depicted in FIG. 23. In this example, the user is paying with cash, miles and points. The price of the flight includes $200 for fare and tax, as well as additional cash fees of $160. The user also pays with 20,000 airline miles valued at $160 and 20,000 points, valued at $160. Total passenger input is thus $680. The passenger receives $55 in airline miles for taking the flight. The true cost is thus $625.

System Booking Instructions (FIGS. 29-37)

It is desirable for any and all payment methods the user is presented with or wishes to view to include accompanying instructions that direct the user on how to most easily purchase the product (e.g., book the flight). Additionally, it is preferable, that for certain if not all payment methods, the reservation or purchase transaction can be executed directly and instantly (e.g., reserving or booking the flight), and/or significantly facilitated relative to traditional offerings, as shown in FIGS. 29-37. For example, a seamless direct and/or 1-click booking of rewards-associated purchase is unique to this particular disclosure. A possible implementation of 1-click booking is to use the same screen scraping methods used to obtain pricing from airline websites. A user may even leverage the system to reserve multiple payment methods or itineraries/flights in the same session. For example, a user could reserve an itinerary via the "Use Miles/Points" payment method on both AMERICAN AIRLINES and UNITED AIRLINES, and reserve an itinerary via the "PAY $" payment method on DELTA AIR LINES.

The trading platform/exchange functionality of the system also provides leverage for enhanced booking. It is anticipated that the system will enable multiple parties to trade/share/ exchange reward program currencies across their various accounts with other users and entities. This platform can also enable reservation and purchase of a flight via a payment method that the user would otherwise not be able to execute/ afford. For example, if a user does not have enough of a program balance to purchase a "Use Miles/Points" payment method, but another user does and is willing to engage in a trade, the system can automate purchase of the flight for said payment method via another user's balance and coordinate a balance transaction that is equitable to both parties. Alternatively, the system could arrange a direct transfer (probably for some equitable payment now or in the future) of the necessary currency from one user's account to the user's account that wishes to make the purchase. Upon completion of the personal transfer transaction, the user that didn't have enough of a balance could now purchase the desired flight. Another example would be to integrate the use of one user's hypothetical extra upgrade certificate for another user's purchase of a premium cabin in return for suitable compensation. Likewise, given the potential delay associated with the "Transfer" payment method, an immediate purchase could be executed by another user or the system owners, assuming either has a sufficient balance and is willing to engage in the transaction, likely in exchange for additional compensation, via the "Use Miles/Payment" method, while a personal transfer of the equivalent amount of currency is sent from the initiating user's account to the purchasing entity's account. Systems described herein are capable of performing a number of unique purchase transactions.

One advantage of the product search and related functions described herein is that it enables the collection and assessment of granular data regarding a user's actual payment preferences and behaviors across his or her rewards programs and different products and services. The available data includes user behavior and preferences: collected via survey, specified within the management module, interpreted based on existing reward program accounts, and analyzed via historical & current reward program activities (e.g., searches performed, itineraries reserved, transactions booked, purchases, redemptions). This data is unique and invaluable in that it is substantially comprehensive—providing a 360 degree view across all of a user's payment methods, precise—discrete transactional SKU-level data, and personal—for a specific user. As such, this data may be further analyzed to distill and form additional insights and recommendations. In one embodiment, the system enables partners and customers to deliver real-time, targeted, personalized, and unique advertisements, offers, and messages to all, a subset, or a single user. This is due to both the user data collected and the ability to identify system users. Partners generally are only able to collect data about their consumers within the domains of their own program. The present system enables collection of data about those consumers across multiple reward programs, multiple domains such as travel and shopping, and across multiple payment methods (e.g., paying cash vs. miles vs. points vs. transfer vs. upgrade). As users are also generally logged-in when using the system, that identification enables partners to provide a personalized offer to specific users. For example, assume AMEX wanted to target customers who live in NYC and fly internationally several times annually. When a customer fitting that profile uses the system, AMEX could send that customer an offer to sign-up for an AMEX card that would also provide immediate bonus points sufficient to pay for the flight that the user is presently considering. There are limitless embodiments of the special offers that partners could serve to users.

User Recommendations

For instance, this data may be analyzed in order to recommend the optimal reward program for an individual user. The analysis preferably includes examining the payment method analyses described thus far (e.g., product availability, discounts, prices, comparable costs, relative values, best payment method) in conjunction with a user's preferences, behaviors/actions, available payment methods, and other potential variables. For example, if for a majority of user's searches, "Pay w/Points" via the AMEX MR program was the cheapest or best payment method, and the user did not have an AMEX MR associated credit card, the user may receive a recommendation to apply for such a credit card and use it and the MR points for appropriate future payments and/or redemptions. Similarly, if a user routinely uses the Pay w/Points payment method in conjunction with an AMEX credit card, but is only at the Membership Rewards Express level, the user may receive a recommendation to upgrade to Membership Rewards Standard or Membership Rewards First in order to receive more value or to pay less for associated transactions. Similarly, if a user's primary reward program redemptions were for hotels, a user may be recommended to use the STARWOOD program for such transactions if that action would provide more value or would cost less. Likewise, a user could be recommended to use "x" reward program for "A" activities and "y" reward program for "B" activities. The spectrum of impactful recommendations is wide-ranging.

FIGS. 26-28 disclose additional details involved in one embodiment of making recommendations to a user. In the example of FIG. 26, a user may be considering making a purchase by using "pay with points" currency. The detailed recommendation informs the prospective customer of the ranking of this option compared with other payment options. As noted, the information may include a ranking, such as a good, questionable or poor deal. The recommendation may also let the user know he or she is receiving a particular value, of so-many cents per point or mile, and may show reasons, such as additional costs incurred or fees required. A comparison may even be given, that the user customarily receives a value of so-many cents per mile or point for the contemplated currency. Finally, in this example, the fees and also other prices associated with this purchase are shown in detail.

In another embodiment, shown in FIG. 27, a recommendation is made in a different format. The recommendation lets the user know the relative price or cost of the payment option or options, and calculates and presents a price difference between the option under consideration and other available options. The recommendation also informs the user of the value of the contemplated transaction relative to other past or possible transactions for the given currency, e.g., AMEX points, STARWOOD points, DELTA frequent flyer miles, and so forth. The recommendation screen also calculates an opportunity cost for one or more currencies. The opportunity cost may be the usual value of the particular currency in cash terms. For instance, a particular transaction may value STARWOOD points at 1 cent per mile, while the user normally receives 1.5 cents per mile. The opportunity cost the user is surrendering may be greater than the value the user normally receives. Using this technique, the user is effortlessly informed of these particulars. The recommendation may also iterate details on the cash and other considerations required for the purchase. Finally, a note at the bottom of the screen discloses to the prospective buyer the quantitative difference between payment options.

Additional details for the recommendations of FIG. 27 are given in FIG. 28. These may include a calculation of value for each point or mile of the alternate currencies contemplated to for use, and additional discussion of the reasons for the change in value, e.g., additional fees, and so forth.

User Instructions

In one embodiment, the web site for the user may include specific instructions for consummating the transaction. This may include purchasing a product or service, such as booking an airline flight or tour cruise. As disclosed in FIG. 29, one method includes a screen with internet links for making the purchase via a proprietary website, such as the MileWise website. The user may alternately use a vendor's website, use his or her personal computer and use a telephone. The screen also discloses helpful tips, such as the estimated times required for each method that may be used. FIG. 30 presents similar information for a different transaction, making an upgrade for the user's flight.

Figure 33:
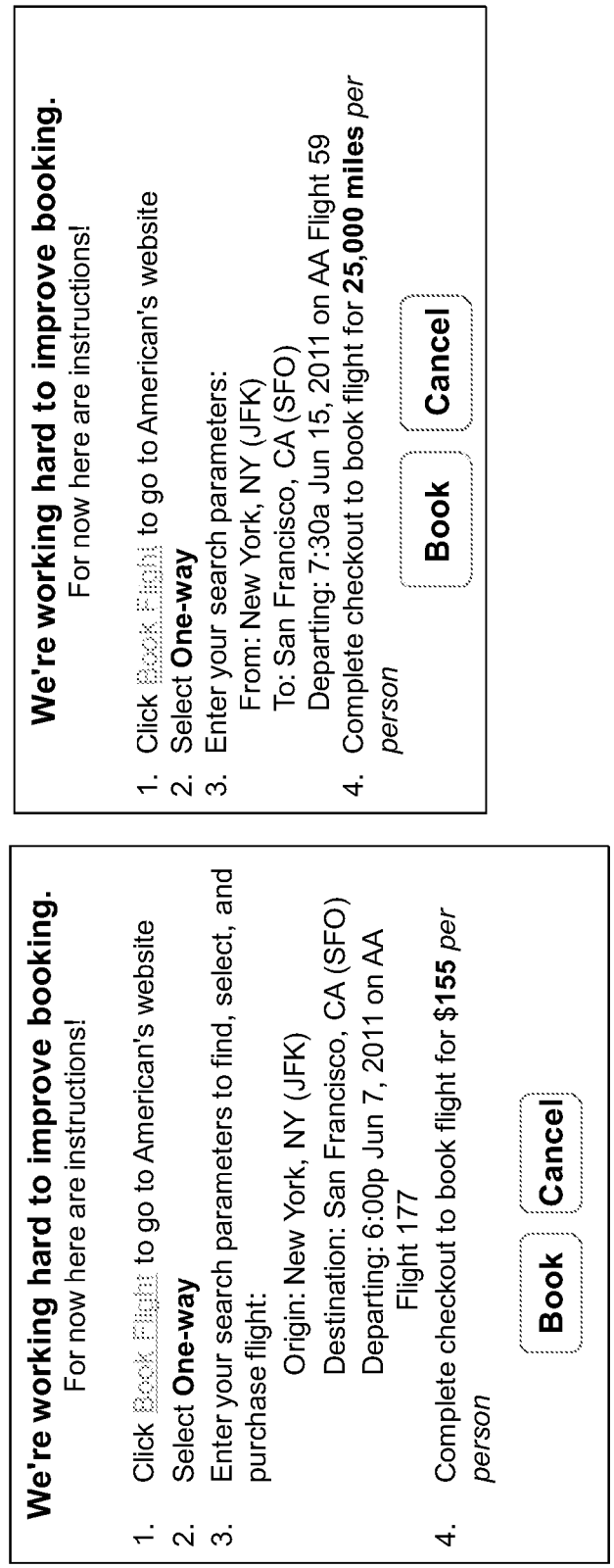
FIG. 33 is an example of an example of Booking Instructions.
Figure 37:
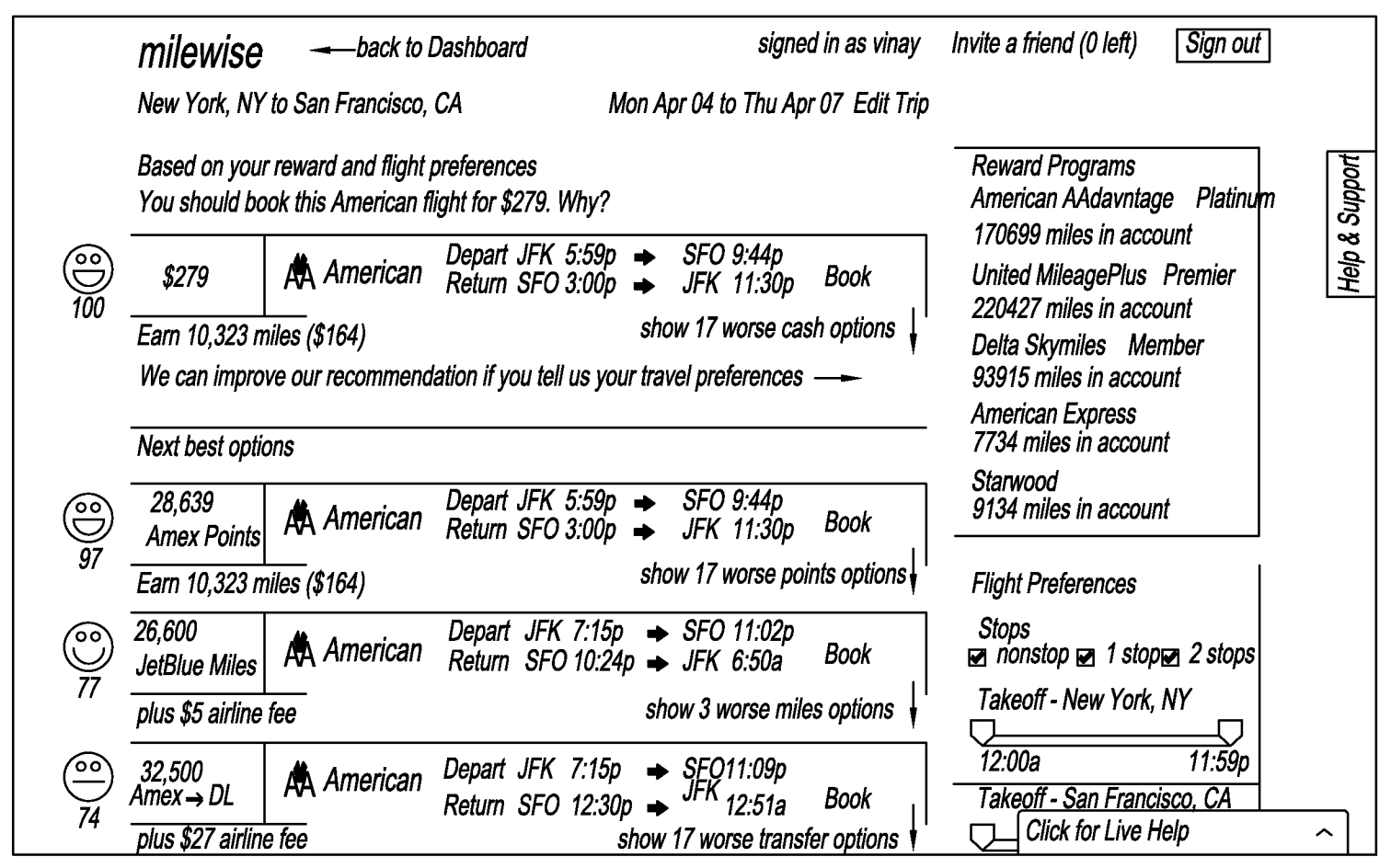

Transferring points from one vendor to another may require more effort. The screen depicted in FIG. 31 depicts programming done for a facilitator's site to ease such transfers. Alternatively, the user may transfer points through the point awarder's website, or may use his or her computer or telephone to effect the transfer. FIG. 32 displays an embodiment of a website portal for making a purchase by paying with points. The options mentioned above are included. FIG. 33-34 disclose additional detailed instructions for completing a transaction, such as how to book a flight, with cash, miles, transfers of points, and paying with points, and how a seamless confirmation of the purchase or reservation may appear to the user. FIGS. 35-37 depict the appearance of alternate or additional user interfaces or screens intended for users of the system.

Subscribers can then use these resources to track how users use their rewards programs and to use this information to make additional contacts with these customers. Table II below depicts some advantages of the present disclosure.

TABLE II

1. A single search request, or 1-click, initiates instant search of multiple payment methods
2. Payment methods include cash or debit/credit cards, gift cards, vouchers, reward programs/units/currency, other potential payment methods, and combinations of the like
3. Easier search of a single reward program
4. Eligible price discounts are automatically integrated into the price
5. Determination of a lowest and total price per payment method
6. Calculation of comparable costs, or indexes/scores, per payment method
7. Calculation of a relative value, or several value measures, per payment method
8. Calculation of personalized comparable costs and personalized value measures
9. Reward program balances automatically considered in presentation of payment methods
10. Reward program balances are valued on a personalized basis, per user
11. Multiple factors can be considered/specified to determine the best payment method
12. Real-time, personalized identification of best payment method
13. Presentation of best payment methods in multiple views corresponding to user preferences
14. Streamlining, or execution, of product reservation and/or purchase
15. Seamless direct and/or 1-click booking of rewards-associated reservation or purchase/redemption
16. User-initiated trading of reward program balances, certificates, and other stored value instruments with other users or entities
17. Automated, system-initiated trading requests of reward program balances, certificates, vouchers, and other stored value instruments with other users or entities
18. Ability to use unique data and analyses to recommend optimal reward programs
19. Leverage unique data, analyses, and user knowledge to enable partners, customers and third parties to deliver real-time, targeted, personalized, and unique advertisements, offers, and messages to all, a subset, or a single user.

In broad embodiments, the computer search and calculation identifies the best payment currency for a product. One way to describe the exemplary system is that it accepts requests from users and then accesses or exchanges information from and with many potential data sources. The system then evaluates the information in order to present the users with the best answers to their search requests. There are many potential external or third party data sources that the system is operable to interface with. In the context of a user's request to search for a flight, Table III depicts some potential data sources, among many others.

TABLE III

For product inventory: an airline web site (e.g., DELTA), a global distribution system (GDS) (e.g., AMADEUS), an alternative content access platform (e.g., ITA SOFTWARE), an online travel agent (e.g., ORBITZ), a consolidator (e.g., EXPEDIA), an online search engine (e.g., KAYAK), etc.
For reward program information: a reward program web site (e.g., AMEX MEMBERSHIP REWARDS), a 3$^{rd}$ party aggregator (e.g., YODLEE)
For payments information: a credit card web site (e.g. AMERICAN EXPRESS), etc.
For discounts: an airline web site, a credit card web site, a deals aggregator (e.g., TRAVELZOO), etc.
For additional reward program functionality: a reward program intermediary (e.g., POINTS.COM)

Other types of data sources may be referenced as well, and any and multiple data sources could be accessed for multiple purposes as well.

With regards to flight inventory, the data sources may provide different levels of detail with respect to availability, price, cost, value, and/or other parameters. For example, airlines provide seat availability at various levels of detail and accuracy through various channels of distribution. The detail level can range from a simple "seats available/unavailable" status for a single fare class to a specific "number of seats available" for every single, sellable fare class. The accuracy can range from an irregular, regular, random or routine update of stored seats available value for a fare class, to a real-time/ each time a seat-is-transacted seats available values for every single fare class. Generally, airlines provide more detail and more accurate availability internally than they provide externally. The airline's own Revenue Management (sometimes called Inventory or Pricing Management), Reservation, and Internet functions and divisions, to name a few, have access to the most detailed and most accurate availability. This internal availability may also include cheaper fares than provided externally. Service providers such as travel agencies, online travel agencies (OTA's), online search engines (such as KAYAK), global distribution systems (GDS's) and all other distributors of airline product not directly managed by the airlines themselves may be provided with less detailed and/or less accurate seat availability. In addition, the fares posted may not be the cheapest fares available to the airline's internal customers.

The present disclosure provides access to the more detailed and accurate seat availability that airlines generally provide internally. This seat availability may, but is not necessarily, sourced from the airlines themselves and in some instances may be sourced from a service provider other than the airline with no loss of detail or accuracy. There are many potential embodiments of the system. The components may communicate with each other or one of more of them may be joined into a single component. For example, the Rules DB may be a separate component or may be included within the Pricing Engine. Likewise, the Pricing Engine may be a separate component or may be included with the Search Engine. While all connecting lines within the system schematic of FIG. 2 imply a connection, these connections may be optional and not necessary. The connecting lines indicate that various elements of the disclosed system may be operatively connected or connectable. For example, the WebServer may be bypassed. Furthermore, there may be more or different connections than the ones currently depicted. The data sources may also be accessed directly in lieu of an Internet connection (e.g., hosting a copy or the original instance of an airline's Airline Reservation System).

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device operable to execute program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions operable to be executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the processor may include any number of cores, including dual core processors, quad core processors, other chip-level multiprocessor and the like that combine two or more independent cores (referred to as die by those skilled in the art).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces operable to access other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium operable to store methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces operable to access other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium operable to store methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor operable to execute program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code operable to be executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine operable to execute program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been made in connection with the embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law. Those skilled in the art will understand that various embodiments are described herein for the purposes of illustrating and explaining the aspects of the present invention. Although different aspects, embodiments, or the like may be described separately, it will be understood that they may be combined in any desirable manner. In other words, though embodiments may be described separately the present invention is not intended to foreclose the combination of those embodiments, and expressly includes such combinations. For example, a provider may search for prices and display not prices, but a score or other derived result. The provider may calculate a score for each product or service option, rather than a price. A score that is related to the results of a search and in prices such as cash, points or miles, is equivalent to a price or a value in this context. All documents referenced herein are hereby incorporated by reference.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the invention.

What is claimed is:
1. A method, comprising:
accepting a request from a user to find a product or a service;
in response to the request, conducting a search with at least one computer for prices for the product or service;

calculating with the at least one computer a first result in a first non-cash currency for a rewards program and a second result in a different currency for the product or service; and presenting at least one result of the search, wherein the results of the search are based on data from at least two rewards programs, each of the at least two rewards programs using a non-cash currency.

2. The method of claim 1, wherein the results of the search are based on at least one of historical usage data from the user, a desired future usage by the user, historical usage data from at least one rewards program, and a status of the user.

3. The method of claim 1, wherein the different currency is selected from the group consisting of a domestic currency, a foreign currency, a real currency, a virtual currency, money, rewards points, rewards credits and rewards miles.

4. The method of claim 1, further comprising calculating at least one net value or relative value for each result, and further comprising presenting a best value for the user, wherein the at least one value for each result includes at least one of benefits, discounts, miles, points and rewards expected to be earned for at least one of purchasing or using the product or service.

5. The method of claim 4, further comprising:
adapting the step of calculating based on a user's historical usage of the at least one currency or based on at least one response from the user to a query concerning at least one of past or prospective use of the currency.

6. The method of claim 1, wherein the step of conducting the search is performed in response to a single command from the user.

7. The method of claim 1, further comprising collecting and storing information on a plurality of balances or usage activities in a user's rewards programs.

8. The method of claim 1, further comprising collecting information on prices for a plurality of goods and services, the prices including a plurality of rewards program prices and money prices, for inclusion into a database for use in the step of searching.

9. The method of claim 1, further comprising accepting payment for the product or service using a non-cash currency from a different user, wherein the non-cash currency from the different user is routed to the user or to a provider of the product or service.

10. A method, comprising:
accepting a request from an on-line user to find a product or a service;
in response to the request, conducting a computerized search to find price information for the product or service;
calculating with at least one computer a first result in a non-cash currency for a rewards program and at least one additional result in a second currency for the product or service, wherein the second currency is selected from the group consisting of a non-cash currency, a domestic currency, a foreign currency, a real currency, a virtual currency and money; and
presenting at least one result of the search to the on-line user, wherein the results of the search are based on data from at least two rewards programs, each of the at least two rewards programs using a non-cash currency, the data including one or more items selected from the group consisting of historical usage data from the user, a desired future usage by the user and a status of the user.

11. The method of claim 10, wherein the step of presenting comprises presenting only a lowest price option to the user, and wherein additional results of the searching are available for presenting to the on-line user.

12. The method of claim 10, further comprising calculating an average value in a common currency over a time period for the at least one currency for a rewards program and comparing the average value to a present value in the common currency of the at least one currency for a rewards program in results presented to the on-line user.

13. The method of claim 10, further comprising searching for an upgrade in the product or service, and presenting at least one result of the search for the upgrade to the on-line user.

14. The method of claim 13, wherein the search for the upgrade is adapted to calculate a first result in the first currency for the rewards program and a second result in the second currency.

15. The method of claim 10, further comprising presenting information to the user for an exchange or transfer of an amount of a currency from a rewards program.

16. The method of claim 10, further comprising storing a currency balance for at least one rewards program for the user, and optionally using the currency balance in determining the at least one result of the search for presenting to the user.

17. A computer program embodied on a computer-readable, non-transitory medium for conducting a search for a product or service, the computer program containing code segments for steps comprising:
a code segment for receiving a search request from a user to find a product or a service;
a code segment for conducting a computerized search to determine a price for the product or service, in response to the request; and
a code segment for presenting at least one result of the search to the user, wherein the computer program further comprises a code segment for calculating a first result in a first currency and a second result in a different currency for the product or service, wherein at least one of the currencies is a non-cash currency for a rewards program and wherein the at least one result of the search is based on at least two rewards programs, each of the at least two rewards programs using a non-cash currency.

18. The computer program of claim 17, wherein at least one of the currencies is a currency for a rewards program, wherein the results of the search are based on at least one of historical usage data from the user, historical usage data from at least one rewards program, and a status of the user.

19. The computer program of claim 17, further comprising a code segment for converting at least one rewards program currency into a different currency.

20. The computer program of claim 17, further comprising a code segment for calculating at least one of a net value and a relative value in at least one of the first currency, the different currency and a third currency.

21. The computer program of claim 17, further comprising a code segment for presenting a summary of a value of currency in one or more rewards programs of which the user is a member.

22. The computer program of claim 17, further comprising a code segment for at least one of specifying a user preference, calculating an average redemption behavior of a population, or calculating a personal redemption behavior of a user, for use in determining a comparable cost or a relative value of the return results.

23. The computer program of claim 17, further comprising a code segment for determining an optimal reward program for the user based on preferences of the user.

24. A system, comprising:
a computer;
a user database connected to the computer, the user database comprising information of a plurality of users concerning user preferences for products, services and at least one rewards program;
a rules database connected to the computer, the rules database comprising information of a plurality of merchants and providers of products and services, said rules database also comprising information for rewards programs of the plurality of merchants and providers and including data from at least two rewards programs, each of the at least two rewards programs using a non-cash currency;
a computer program embodied on a computer-readable non-transitory memory accessible to the computer, the computer program comprising a search engine for searching for prices for the products and services, and a pricing engine for calculating prices, values and costs for the products and services,
wherein the computer program is adapted to calculate a first price in a first currency and a second price in a different currency for at least one product or service, wherein at least one of the currencies is a non-cash currency for a rewards program, and to present results of the searching.

25. The system of claim 24, wherein the computer program is adapted to access a plurality of providers, intermediaries and aggregators of the products and services to update the rules database and the user database.

26. The system of claim 24, wherein the computer program is adapted to search for a best value in at least two currencies wherein at least one of the currencies is a currency for a rewards program, based on a combination of prices, relative values and user preferences.

27. The system of claim 24, wherein the computer program is adapted to update the user database by accumulating discrete transactional data of individual user's purchases, preferences, and redemption behavior across multiple payment methods, including rewards programs.

28. The system of claim 24, wherein at least one of the prices is a price in more than one currency.

29. A system, comprising:
a computer;
a user database connected to the computer, the user database comprising information of a plurality of users concerning user preferences for products, services and at least two rewards programs;
a rules database connected to the computer, the rules database comprising information of a plurality of merchants and providers of products and services, said rules database also comprising information for rewards programs of the plurality of merchants and providers, and including data from at least two rewards programs, each of the at least two rewards programs using a non-cash currency;
a computer program embodied on a computer-readable, non-transitory memory accessible to the computer, the computer program comprising a search engine for searching for prices for the products and services, and a pricing engine for calculating prices, values and costs for the products and services,
wherein the computer program is adapted to calculate a first price in at least one currency and a second price in more than one currency for a desired product of service, the second price including at least one non-cash currency, for at least one product or service, and to present results of the searching.

30. The system of claim 29, wherein at least one of the currencies is a currency for a rewards program.

* * * * *